(12) United States Patent
John Wilson et al.

(10) Patent No.: US 10,547,429 B2
(45) Date of Patent: Jan. 28, 2020

(54) SEARCH CANDIDATES IN MULTI-LINK CONTROL CHANNEL

(71) Applicant: QUALCOMM Incorporated, San Diego, CA (US)

(72) Inventors: Makesh Pravin John Wilson, San Diego, CA (US); Tao Luo, San Diego, CA (US); June Namgoong, San Diego, CA (US); Sumeeth Nagaraja, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/875,524

(22) Filed: Jan. 19, 2018

(65) Prior Publication Data

US 2018/0227102 A1    Aug. 9, 2018

Related U.S. Application Data

(60) Provisional application No. 62/457,083, filed on Feb. 9, 2017.

(51) Int. Cl.
*H04L 5/00* (2006.01)
*H04W 72/04* (2009.01)
*H04B 7/06* (2006.01)

(52) U.S. Cl.
CPC ......... *H04L 5/0053* (2013.01); *H04B 7/0617* (2013.01); *H04L 5/0094* (2013.01);
(Continued)

(58) Field of Classification Search
CPC ... H04L 5/0053; H04L 5/0048; H04L 5/0094; H04W 72/046; H04W 72/042; H04W 74/0833; H04B 7/0617
(Continued)

(56) References Cited

U.S. PATENT DOCUMENTS

2013/0286960 A1    10/2013    Li et al.
2016/0021565 A1    1/2016    Kim et al.
(Continued)

FOREIGN PATENT DOCUMENTS

WO    WO2017083514 A1    5/2017
WO    WO2017151876 A1    9/2017

OTHER PUBLICATIONS

Guangdong Oppo Mobile Telecom: "Search Space Design Consideration for NR PDCCH", 3GPP Draft; R1-1701951 , vol. RAN WG1, No. Athens, Greece; Feb. 13, 2017-Feb. 17, 2017, Feb. 7, 2017 (Feb. 7, 2017), XP051220925, 5 Pages, Retrieved from the Internet: URL:http://www.3gpp.org/ftp/tsg_ran/WG1_RL1/TSGR1_88/Docs/ [retrieved on Feb. 7, 2017].
(Continued)

*Primary Examiner* — Faisal Choudhury
(74) *Attorney, Agent, or Firm* — Holland & Hart LLP

(57) ABSTRACT

Some wireless communication systems may operate in frequency ranges that are associated with beamformed transmissions between wireless devices. In such systems, a user equipment (UE) may be configured to monitor physical downlink control channel (PDCCH) on multiple beam pair links. In order to decode relevant downlink control information (DCI), a UE may perform multiple blind decodes on a control region of a downlink transmission. Blind decoding may be resource-intensive (e.g., computationally complex, energy consuming, etc.), but some systems may be efficiently designed to support the desired PDCCH monitoring via multiple beam pair links without significantly increasing the number of blind decodes at the UE. Aspects of such a design may include non-uniform candidate restriction, beam pair link-specific search spaces, and random control channel element (CCE) mapping across a candidate search space.

30 Claims, 15 Drawing Sheets

(52) U.S. Cl.
CPC ......... *H04W 72/046* (2013.01); *H04L 5/0048* (2013.01); *H04W 72/042* (2013.01)

(58) Field of Classification Search
USPC ........................................................ 370/329
See application file for complete search history.

(56) References Cited

U.S. PATENT DOCUMENTS

| | | |
|---|---|---|
| 2016/0050094 A1 | 2/2016 | Ryu et al. |
| 2018/0192405 A1* | 7/2018 | Gong .................... H04L 5/0053 |
| 2018/0227887 A1* | 8/2018 | Hakola .................. H04B 7/022 |
| 2018/0234959 A1* | 8/2018 | Ahn .................. H04W 72/0406 |

OTHER PUBLICATIONS

Huawei et al., "Search Space Design Aspects", 3GPP Draft; R1-1701640, vol. RAN WG1, No. Athens, Greece; Feb. 13, 2017-Feb. 17, 2017, Feb. 6, 2017 (Feb. 6, 2017), XP051220523, 5 Pages, Retrieved from the Internet: URL:http://www.3gpp.org/ftp/tsg_ran/WG1_RL1/TSGR1_88/Docs/ [retrieved on Feb. 6, 2017].

Interdigital Communications: "On Beam Management for Control and Data Channels", 3GPP Draft; R1-1702324, vol. RAN WG1, No. Athens, Greece; Feb. 13, 2017-Feb. 17, 2017, Feb. 7, 2017 (Feb. 7, 2017), XP051221203, 4 Pages, Retrieved from the Internet: URL:http://www.3gpp.org/ftp/tsg ran/WG1 RL1/TSGR1 88/Docs/ [retrieved on Feb. 7, 2017].

International Search Report and Written Opinion—PCT/US2018/014706—ISA/EPO—dated May 4, 2018.

* cited by examiner

SEARCH CANDIDATES IN MULTI-LINK CONTROL CHANNEL

CROSS REFERENCES

The present application for patent claims priority to U.S. Provisional Patent Application No. 62/457,083 by John Wilson et al., entitled "SEARCH CANDIDATES IN MULTI-LINK CONTROL CHANNEL," filed Feb. 9, 2017, assigned to the assignee hereof.

BACKGROUND

The following relates generally to wireless communication, and more specifically to search candidates in multi-link control channels.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems (e.g., NR systems), a physical downlink control channel (PDCCH) transmission may support robustness against beam pair link blocking. In such systems, a UE may be configured to monitor PDCCH on multiple beam pair links. However, monitoring multiple PDCCHs may be associated with an increased number of blind decodes for the UE, which may in turn be associated with increased UE complexity, energy consumption, etc. Accordingly, improved techniques to reduce the number of blind decodes required to support PDCCH monitoring via multiple beam pair links may be desired. Such techniques may additionally support increased flexibility for a base station attempting to schedule multiple UEs.

SUMMARY

The described techniques relate to improved methods, systems, devices, or apparatuses that support non-uniform search candidate restriction in multi-link control channels. Generally, the described techniques provide a design to support control channel (e.g., physical downlink control channel (PDCCH)) monitoring via multiple beam pair links. In some aspects, the described techniques may reduce the number of blind decodes by a user equipment (UE) when attempting to decode any relevant downlink control information (DCI) that may be contained within a PDCCH. Accordingly, techniques described herein enable non-uniform candidate restriction and flexible search space monitoring. In other words, in a multiple beam pair link scenario, a UE may be configured to monitor different beam pair links using different numbers of search candidates. Additionally or alternatively, the described candidate restriction techniques may enable flexible scheduling of UEs.

A method of wireless communication is described. The method may include identifying multiple beam pair links for communication with one or more base stations, determining a set of search candidates for each of the multiple beam pair links, each of the multiple beam pair links corresponding to a respective set of search candidates such that at least two of the multiple beam pair links correspond to different numbers of search candidates, and monitoring each of the multiple beam pair links in accordance with the respective sets of search candidates.

An apparatus for wireless communication is described. The apparatus may include means for identifying multiple beam pair links for communication with one or more base stations, means for determining a set of search candidates for each of the multiple beam pair links, each of the multiple beam pair links corresponding to a respective set of search candidates such that at least two of the multiple beam pair links correspond to different numbers of search candidates, and means for monitoring each of the multiple beam pair links in accordance with the respective sets of search candidates.

Another apparatus for wireless communication is described. The apparatus may include a processor, memory in electronic communication with the processor, and instructions stored in the memory. The instructions may be operable to cause the processor to identify multiple beam pair links for communication with one or more base stations, determine a set of search candidates for each of the multiple beam pair links, each of the multiple beam pair links corresponding to a respective set of search candidates such that at least two of the multiple beam pair links correspond to different numbers of search candidates, and monitor each of the multiple beam pair links in accordance with the respective sets of search candidates.

A non-transitory computer readable medium for wireless communication is described. The non-transitory computer-readable medium may include instructions operable to cause a processor to identify multiple beam pair links for communication with one or more base stations, determine a set of search candidates for each of the multiple beam pair links, each of the multiple beam pair links corresponding to a respective set of search candidates such that at least two of the multiple beam pair links correspond to different numbers of search candidates, and monitor each of the multiple beam pair links in accordance with the respective sets of search candidates.

In some examples of the method and apparatus described above, the determined set of search candidates for each of the multiple beam pair links corresponds to respective core sets of resources based on a supported aggregation level for each of the multiple beam pair links.

In some examples of the method, apparatus, and non-transitory computer-readable medium described above, determining the set of search candidates for each of the multiple beam pair links includes determining the set of search candidates for each of the multiple beam pair links based on a set of search candidate tables.

Some examples of the method, apparatus, and non-transitory computer-readable medium described above may further include processes, features, means, or instructions for selecting a search candidate table for each of the multiple beam pair links from the set of candidate tables.

Some examples of the method, apparatus, and non-transitory computer-readable medium described above may further include processes, features, means, or instructions for receiving a message from a base station of the one or more base stations, the message indicating a search candidate table having a set of search candidates corresponding to a beam pair link for communication with the base station.

In some examples of the method, apparatus, and non-transitory computer-readable medium described above, the message may be received via a radio resource control (RRC) channel, a medium access control control-element (MAC-CE), a layer 1 (L1) message, or any combinations thereof.

Some examples of the method, apparatus, and non-transitory computer-readable medium described above may further include processes, features, means, or instructions for receiving, over a beam pair link of the multiple beam pair links, control information from a base station of the one or more base stations, the receiving based on the determined set of search candidates for the beam pair link.

In some examples of the method, apparatus, and non-transitory computer-readable medium described above, the set of search candidates for each of the multiple beam pair links may be determined based on an aggregation level, a polarization, a rank, a signal to noise ratio, or any combination thereof associated with each of the multiple beam pair links.

A method of wireless communication is described. The method may include identifying, at a base station, one or more beam pair links for communication with a UE, determining a set of search candidates for each of the one or more beam pair links based on a communication parameter associated with the UE and with each of the one or more beam pair links, and transmitting, to the UE, a message indicating the sets of search candidates for use in monitoring by the UE the one or more beam pair links.

An apparatus for wireless communication is described. The apparatus may include means for identifying, at a base station, one or more beam pair links for communication with a UE, means for determining a set of search candidates for each of the one or more beam pair links based on a communication parameter associated with the UE and with each of the one or more beam pair links, and means for transmitting, to the UE, a message indicating the sets of search candidates for use in monitoring by the UE the one or more beam pair links.

Another apparatus for wireless communication is described. The apparatus may include a processor, memory in electronic communication with the processor, and instructions stored in the memory. The instructions may be operable to cause the processor to identify, at a base station, one or more beam pair links for communication with a UE, determine a set of search candidates for each of the one or more beam pair links based on a communication parameter associated with the UE and with each of the one or more beam pair links, and transmit, to the UE, a message indicating the sets of search candidates for use in monitoring by the UE the one or more beam pair links.

A non-transitory computer readable medium for wireless communication is described. The non-transitory computer-readable medium may include instructions operable to cause a processor to identify, at a base station, one or more beam pair links for communication with a UE, determine a set of search candidates for each of the one or more beam pair links based on a communication parameter associated with the UE and with each of the one or more beam pair links, and transmit, to the UE, a message indicating the sets of search candidates for use in monitoring by the UE the one or more beam pair links.

In some examples of the method and apparatus described above, the determined set of search candidates for each of the multiple beam pair links corresponds to respective core sets of resources based on a supported aggregation level for each of the multiple beam pair links.

In some examples of the method, apparatus, and non-transitory computer-readable medium described above, determining the sets of search candidates for each of the one or more beam pair links includes determining the set of search candidates for the one or more beam pair links based on a set of search candidate tables.

Some examples of the method, apparatus, and non-transitory computer-readable medium described above may further include processes, features, means, or instructions for selecting a search candidate table for the beam pair link from the set of candidate tables, where a number of search candidates of the search candidate table for a first beam pair link of the UE may be different from a number of search candidates for a second beam pair link of the UE.

In some examples of the method, apparatus, and non-transitory computer-readable medium described above, the second beam pair link of the UE corresponds to a beam pair link between the UE and the base station or between the UE and a second different base station.

In some examples of the method, apparatus, and non-transitory computer-readable medium described above, determining the set of search candidates includes receiving a measurement report from the UE. Some examples of the method, apparatus, and non-transitory computer-readable medium described above may further include processes, features, means, or instructions for determining the set of search candidates based on the measurement report.

In some examples of the method, apparatus, and non-transitory computer-readable medium described above, determining the set of search candidates includes receiving, from the UE, a search candidate table message that indicates an intended search candidate table for the beam pair link. Some examples of the method, apparatus, and non-transitory computer-readable medium described above may further include processes, features, means, or instructions for determining the set of search candidates based on the intended search candidate table.

In some examples of the method, apparatus, and non-transitory computer-readable medium described above, the set of search candidates may be based on an aggregation level, a polarization, a rank, a signal to noise ratio, or any combination thereof associated with the beam pair link.

Some examples of the method, apparatus, and non-transitory computer-readable medium described above may further include processes, features, means, or instructions for mapping a set of control channel elements (CCEs) for each of the one or more beam pair links, where the mapping of at least one of the sets of CCEs may be randomized based on a symbol index, a slot index, a subframe index, a resource block of a control resource set, or a carrier index.

Some examples of the method, apparatus, and non-transitory computer-readable medium described above may further include processes, features, means, or instructions for transmitting control information for the UE over an established beam pair link in accordance with the determined set of search candidates.

DETAILED DESCRIPTION

Some wireless communication systems may operate in frequency ranges that support beamformed transmissions between wireless devices. For example, communications in millimeter wave (mmW) frequency bands may experience increased signal attenuation (e.g., path loss). As a result, signal processing techniques, such as beamforming, may be used to combine energy coherently and overcome the path losses in these systems. In such systems, a user equipment (UE) may be configured to monitor physical downlink control channel (PDCCH) on multiple beam pair links. Beam pair links may refer to a pairing of a transmit beam (e.g., from a base station) and a receive beam (e.g., at a UE), where each beam is formed by an array of antennas at the corresponding device.

In order to decode relevant downlink control information (DCI), a UE may perform multiple blind decodes on a control region of a downlink transmission. Blind decoding may refer to a lack of a priori knowledge on the part of the UE. That is, a UE performing a blind decode may have relatively little knowledge as to what information the UE is to receive and where any such information is located in time and frequency. Accordingly, blindly decoding portions of time and frequency resources may be intensive (e.g., computationally complex, energy consuming, etc.). In wireless communication systems (e.g., new radio (NR) systems) in which a UE is configured to monitor PDCCH on multiple beam pair links, the number of blind decodes may scale proportionally with the number of beam pair links. Such systems may be designed to support the desired PDCCH monitoring via multiple beam pair links without significantly increasing the number of blind decodes at the UE.

Aspects of such a design may include non-uniform candidate restriction, beam pair link-specific search spaces, and random control channel element (CCE) mapping across a candidate search space.

Aspects of the disclosure are initially described in the context of a wireless communications system. Further examples are then provided of beam pair links and search spaces. Aspects of the disclosure are further illustrated by and described with reference to apparatus diagrams, system diagrams, and flowcharts that relate to search candidates in multi-link control channel.

Figure 1:
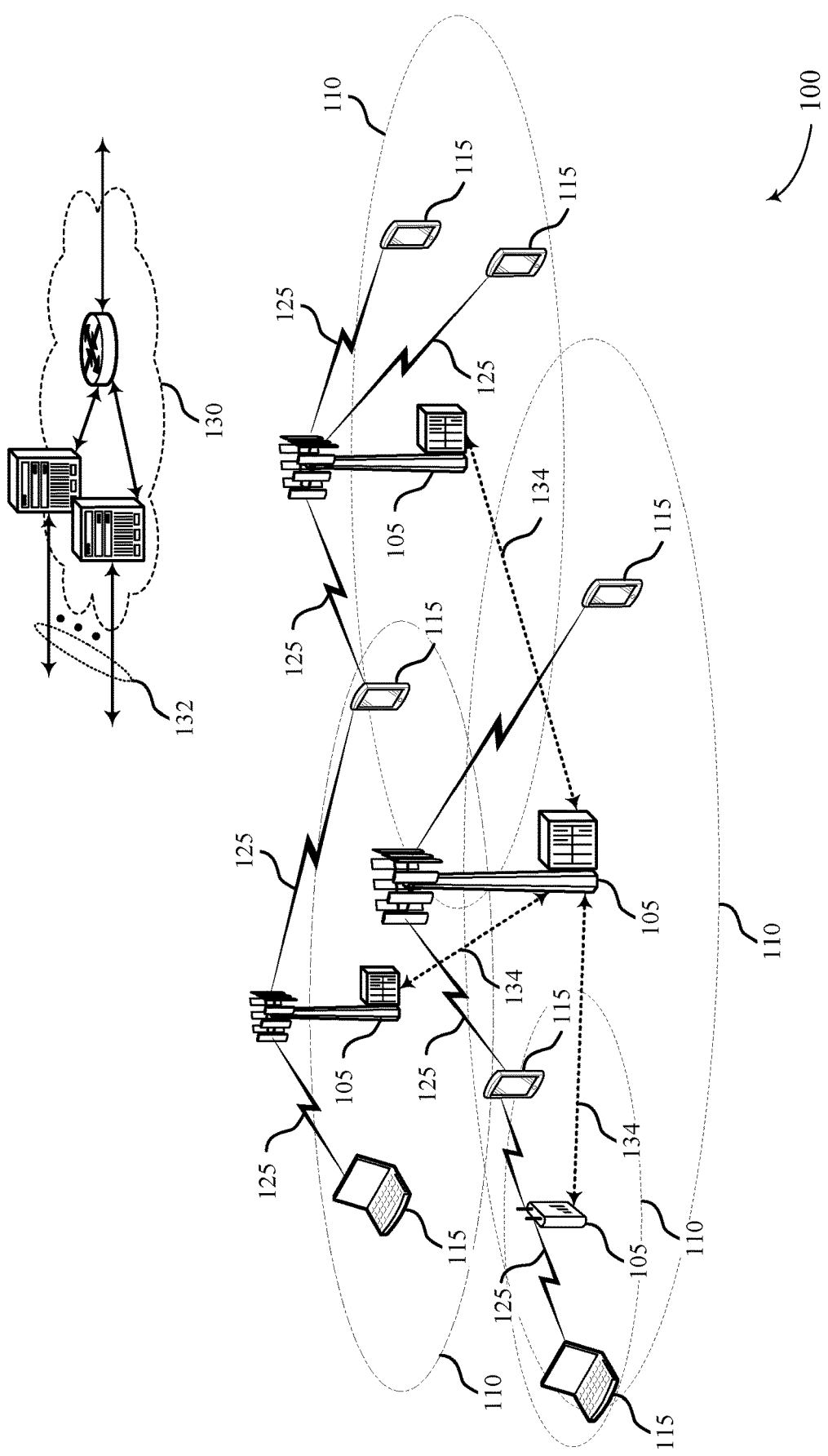
FIG. 1 illustrates an example of a system for wireless communication that supports non-uniform search candidate restriction in multi-link control channels in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, LTE-Advanced (LTE-A) network, or a NR network. In some cases, wireless communications system 100 may support enhanced broadband communications, ultra-reliable (e.g., mission critical) communications, low latency communications, and communications with low-cost and low-complexity devices. Wireless communications system 100 may support the efficient use of resources by enabling search candidates in multi-link control channel and different beam pair links between a UE 115 and a base station 105 may support different numbers of search candidates.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, e.g., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors.

Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 115) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input, multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals. Each of these beams may be referred to as a receive beam in aspects of the present disclosure.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 2:
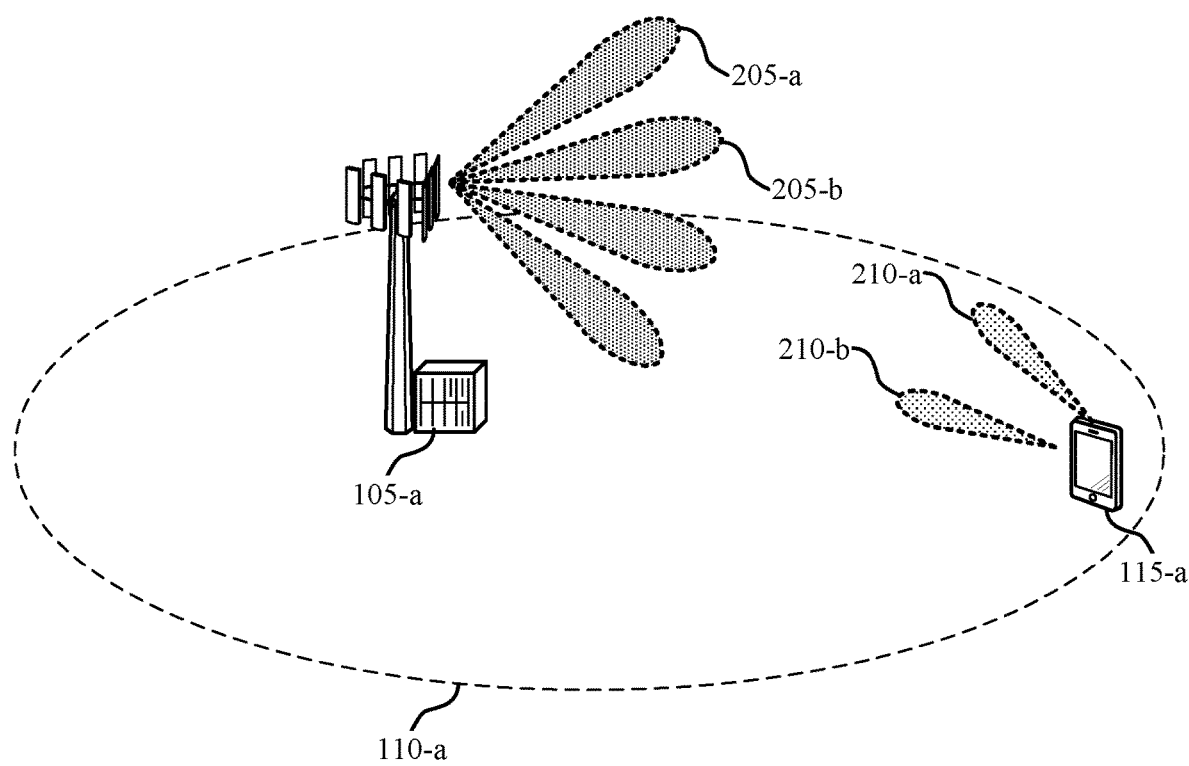
FIG. 2 illustrates an example of a wireless communications system that supports non-uniform search candidate restriction in multi-link control channels in accordance with aspects of the present disclosure.

FIG. 2 illustrates an example of a wireless communications system 200 that supports non-uniform search candidate restriction in multi-link control channels in accordance with various aspects of the present disclosure. Wireless communications system 200 includes a base station 105-a and a UE 115-a, each of which may be an example of the corresponding device described with reference to FIG. 1.

Wireless communications system 200 may operate in frequency ranges that are associated with beamformed transmissions between base station 105-a and UE 115-a. For example, wireless communication system 200 may operate using mmW frequency ranges. As a result, signal processing techniques, such as beamforming, may be used to combine energy coherently and to overcome path losses.

By way of example, base station 105-a may contain multiple antennas. In some cases, each antenna may transmit a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit the wireless communications system 200.

Transmit beams 205-a and 205-b represent examples of beams over which data may be transmitted. Accordingly, each transmit beam 205 may be directed from base station 105-a toward a different region of the coverage area 110-a and in some cases, two or more beams may overlap. Transmit beams 205-a and 205-b may be transmitted simultaneously or at different times. In either case, a UE 115-a may be capable of receiving one or more transmit beams 205 via respective receive beams 210-a and 210-b.

In one example, UE 115-a may form one or more receive beams 210. Similar to base station 105-a, UE 115-a may contain multiple antennas. The receive beams 210-a and 210-b may each receive one of the transmit beams 205-a and 205-b (e.g., UE 115-a may be positioned within wireless communication systems 200 such that it receives both beamformed transmit beams 205). Such a scheme may be referred to as a receive-diversity scheme. In some cases, the receive beams 210 may receive a single transmit beam 205-a (e.g., receive beam 210-a may receive the transmit beam 205-a with various pathloss and multipath effects included). That is, each antenna of UE 115-a may receive the transmit beam 205-a which has experienced different path losses or phase shifts (e.g., different phase shifts due to the different path lengths between the base station 105-a and the respective antennas of the UE 115-a) and appropriately combine the received signals represented by receive beams 210-a and 210-b. A transmit beam 205 and a corresponding receive beam 210 may be referred to as a beam pair link.

Figure 3:
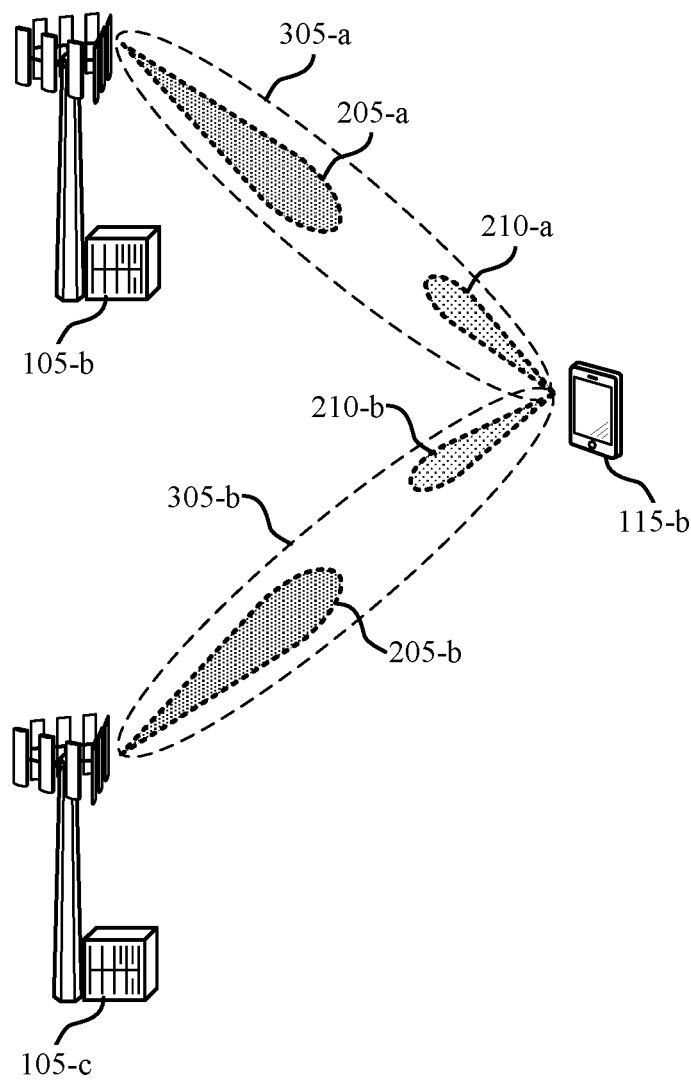
FIG. 3 illustrates an example of a wireless communications system that supports non-uniform search candidate restriction in multi-link control channels in accordance with aspects of the present disclosure.

FIG. 3 illustrates an example of a wireless communications system 300 that supports non-uniform search candidate restriction in multi-link control channels in accordance with various aspects of the present disclosure. Wireless communications system 300 includes base stations 105-b and 105-c and UE 115-*b*, each of which may be an example of the corresponding devices described with reference to FIGS. 1 and 2. Wireless communications system 300 supports multi-beam communication, and as illustrated, UE 115-*b* may communicate with different transmission points (e.g., base stations 105-*b* and 105-*c*). In some cases, the multi-beam communication may be achieved using a single transmission point (e.g., base station 105-*b* or base station 105-*c* may communicate with UE 115-*b* over multiple beams). While the present example is described using two transmission points, the techniques described herein may be extended to any suitable number of transmission points and/or beam pair links (three, four, etc.).

In the present example, base station 105-*b* may send transmit beam 205-*a* from one or more antennas (e.g., transmit beam 205-*a* may be beamformed as described above with reference to FIGS. 1 and 2). UE 115-*b* may receive transmit beam 205-*a* at one or more antennas forming receive beam 210-*a*. Beam pair links 305 may refer to pairs of transmit beams 205 and receive beams 210 used for communication between wireless devices. In this example, transmit beam 205-*a* and receive beam 210-*a* may be referred to as beam pair link 305-*a*. Beam pair link 305-*a* may be established during cell acquisition (e.g., through synchronization signals) or through a beam refinement procedure where UE 115-*b* and base station 105-*b* try various combinations of finer transmission beams and receive beams until a suitable beam pair link 305 is determined.

Similarly, base station 105-*c* may send transmit beam 205-*b* from one or more antennas. In some cases, transmit beams 205-*a* and 205-*b* may be sent simultaneously. Alternatively, the transmit beams 205 may be sent at different times (e.g., using TDD). UE 115-*b* may receive transmit beam 205-*b* at one or more antennas forming receive beam 210-*b*. Transmit beam 205-*b* and receive beam 210-*b* may be referred to as beam pair link 305-*b*.

Wireless communications system 300 may be an example of a NR system in which PDCCH transmission may be designed to support robustness against beam pair link 305 blocking. Accordingly, UE 115-*b* may be configured to monitor PDCCH on beam pair link 305-*a* and on beam pair link 305-*b*. Each PDCCH may carry DCI, which may convey downlink scheduling commands, uplink scheduling grants, uplink power control commands, etc. for the respective beam pair links 305. A plurality of PDCCHs may be carried in a control region of each beam pair link 305. In some cases, each PDCCH may support multiple DCI formats, and the DCI format used may be unknown to UE 115-*b* at the time of transmission. Therefore, UE 115-*b* may blindly detect the format of each PDCCH, which may involve performing the same number of blind decodes for each established beam pair link (e.g., twice as many as would be required for a single communication link as shown in this example). The increased number of blind decodes may place an increased computational burden on UE 115-*b*, which may increase energy expenditure or otherwise increase the complexity of UE 115-*b*. Accordingly, care may be taken in the design of the respective PDCCHs to reduce the number of blind decodes.

In some wireless communications systems, the resource element mapping for the PDCCH may be organized using CCEs, each of which may include a plurality (e.g., 6, 9) of resource element groups (REGs), which may have not already been assigned to the physical control format indicator channel (PCFICH) or the physical HARQ indicator channel (PHICH). Depending on various factors (e.g., the length of a DCI message), a base station 105 may transmit a PDCCH scheduling message to a UE 115 by mapping a DCI message onto one, two, four, or eight consecutive CCEs (e.g., 36, 72, 144, or 288 resource elements (REs)). The base station 105 may determine a PDCCH format in accordance with a DCI which is to be transmitted to the UE 115 and attach a cyclic redundancy check (CRC) to the control information. In some cases, the CRC may be masked with an identifier (e.g. a radio network temporary identifier (RNTI)). Various RNTIs may be used for different purposes. As an example, in the case that the PDCCH is provided for a paging message, a paging-RNTI may be masked on the CRC. If the PDCCH is provided for a specific UE 115, a cell-RNTI of the corresponding UE 115 may be masked on the CRC.

In some cases, base stations 105-*b* and 105-*c* may transmit control information (e.g., PDCCH and corresponding DCI) to UE 115-*b* in a control resource set (e.g., core set) of a TTI. The core set may include one or more CCEs that may include control information for UE 115-*b*. In some cases, the number of CCEs within a core set (e.g., the aggregation level) may be configured by base station 105-*b* or 105-*c* based on the amount of control information to be transmitted in the core set, the quality of a channel that includes the core set, etc. In some examples, base station 105-*b* or 105-*c* may use an aggregation level of one (1), two (2), four (4), or eight (8) for control transmissions to UE 115-*b* in a core set.

In some cases, the number of symbols allocated for control signaling in a core set (e.g., 1, 2, or 3 symbols) may be configured by higher layer signaling. In some examples, if the core set spans a single symbol, the REGs within the core set may be mapped to CCEs within the core set in the frequency domain first, followed by the time domain (e.g., frequency first CCE-to-REG mapping). In such examples, a first set of consecutive REGs (e.g., consecutive in the frequency domain) may be mapped to a first CCE (e.g., a first CCE aggregation), a second set of consecutive REGs may be mapped to a second CCE (e.g., a second CCE aggregation), and so forth. In other examples, if the core set spans multiple symbols, the REGs within the core set may be mapped to CCEs within the core set in the time domain first, followed by the frequency domain (e.g., time first CCE-to-REG mapping). In such examples, a set of REGs across the multiple symbols at a first frequency may be mapped to a CCE in order of the symbols associated with each REG, and, after all REGs at the first frequency are mapped to the CCE, REGs at a second frequency may be mapped to the CCE in order of the symbols associated with each REG.

In order to reduce the number of blind decoding attempts, it may be beneficial to have mechanisms that limit the number of CCE aggregations that UE 115-*b* is expected to monitor. From a scheduling point of view, such restrictions in the allowed aggregations may be undesirable as they may influence the scheduling flexibility and involve additional processing for the base station 105. Thus, in order to impose less restrictions while simultaneously limiting the maximum number of blind decoding attempts for UE 115-*b*, the CCEs may be organized into search spaces, which may be further classified as common search spaces and UE-specific search spaces. Each subframe, UE 115-*b* may read the control format indicator (e.g., PCFICH) and establish the size of the downlink control region and the locations of the various search spaces. Additionally or alternatively, the size of the downlink control region may be semi-statically configured (e.g., by a base station 105 or some other network entity). Within each search space, UE 115-*b* may identify the possible PDCCH candidates, which may refer to CCEs where the base station 105 may have transmitted the DCI for UE 115-*b*. UE 115-*b* may then attempt to process each PDCCH candidate using all the combinations of RNTIs and DCI formats that it has been configured to look for. If the observed CRC bits for a PDCCH candidate match the ones expected, UE 115-*b* may conclude that the message was intended for it and read the DCI.

The PDCCH may support multiple (e.g., four, sixteen, thirty-two, etc.) different aggregation levels corresponding to one, two, four, eight, etc. CCEs. In each subframe (and for each beam pair link 305), UE 115-*b* may attempt to decode all the PDCCHs (e.g., all possible aggregation levels) in each of its search spaces. Other aggregation levels may be supported without deviating from the scope of the present disclosure.

In some cases, the search spaces may be further refined through the use of candidate restriction. As an example, in some systems supporting multiple component carriers (e.g., LTE systems), uniform candidate restriction may be employed such that the number of PDCCH candidates for each carrier is reduced by half. However, uniform candidate restriction may impose unnecessary limitations when applied across two beam pair links 305. Accordingly, aspects of the present disclosure support non-uniform candidate restriction for the respective beam pair links 305 such that the candidate restriction of each beam pair link 305 may be separately determined (e.g., independently from the candidate restriction of the other beam pair link 305). As an example, beam pair link 305-*a* might have a lower signal to noise ratio (SNR) than beam pair link 305-*b*. In some cases, the beam pair link with the lower SNR (e.g., beam pair link 305-*a*) may employ a higher aggregation level (e.g., four or eight) than the beam pair link with the higher SNR (e.g., beam pair link 305-*b*), which may use a lower aggregation level (e.g., one or two). Additionally or alternatively, each beam pair link 305 may have a respective configured core set. For example, beam pair link 305-*a* may include a first core set with a first number of PDCCH candidates and a first aggregation level, and beam pair link 305-*b* may include a second core set with a second number of PDCCH candidates and a second aggregation level.

Further, each beam pair link 305 may have a different table indicating how UE 115-*b* is to monitor the respective search space. For example, the table may include a set of search candidates to be monitored by UE 115-*b*. In some cases, the table may be a function of SNR, polarization, supported rank of UE 115-*b*, etc. As an example, UE 115-*b* may be able to receive one polarization for beam pair link 305-*a*, but two polarizations for beam pair link 305-*b*. Accordingly, the table for the given beam pair link 305 may reflect the capabilities of UE 115-*b*, as well as various factors within the communication environment for the given beam pair link 305.

In some cases, UE 115-*b* may identify its intended table from a list of tables for the given beam pair link 305 and provide feedback to the associated base station 105. Additionally or alternatively, the base station 105 may configure the tables based on UE 115-*b* measurement reports (e.g., via RRC signaling).

In some aspects, the benefits of candidate restriction may be balanced with the flexibility of the base station 105 to schedule multiple UEs 115. Accordingly, logical CCE mapping may be randomized as a function of the beam pair link 305. Such a design is distinct from current techniques in which candidate restrictions are applied across multiple carriers as a function of the RNTI of the UE 115 and the SFN or slot index. That is, in current techniques, CCEs may be sequentially numbered, but successive CCEs (e.g., CCE 0 and CCE 1) may not be mapped contiguously in frequency tones. Accordingly, there may not be randomization in the logical mapping of these techniques, which may limit base station 105 scheduling flexibility. The CCE mapping randomization described herein may additionally or alternatively be a function of one or more other communication parameters. Examples of such parameters include an orthogonal frequency division multiplexing (OFDM) symbol index, the beam pair link 305, the starting and/or ending resource block (RB) index of the core set, core set ID, index of a core set, etc.

Figure 4:
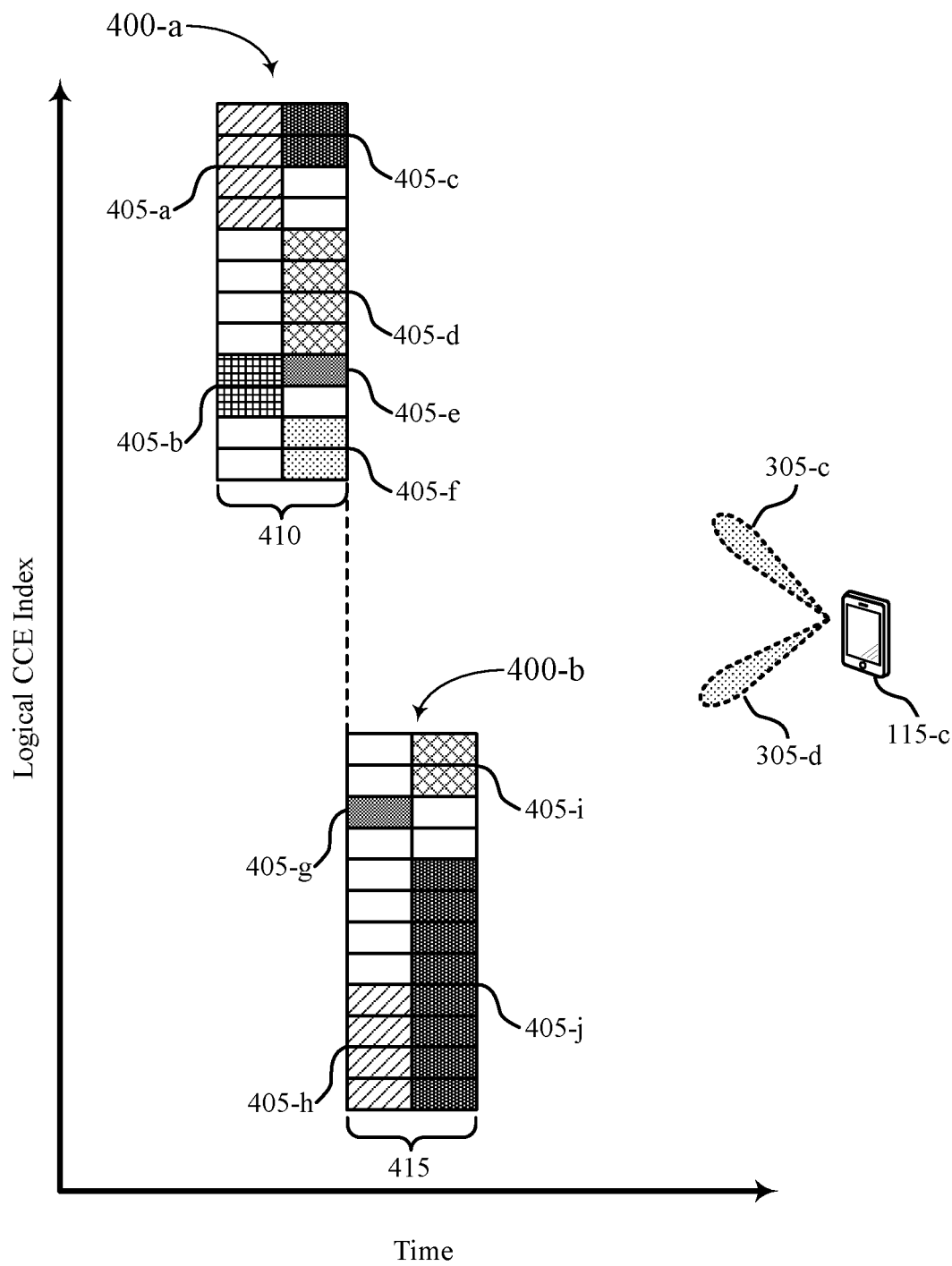
FIG. 4 illustrates an example of a search space that supports non-uniform search candidate restriction in multi-link control channels in accordance with aspects of the present disclosure.

FIG. 4 illustrates example search spaces 400 that support non-uniform search candidate restriction in multi-link control channels in accordance with various aspects of the present disclosure. Each search space 400-*a* and 400-*b* may be associated with a single beam pair link 305-*c* and 305-*d*, respectively, of UE 115-*c*. Beam pair links 305-*c* and 305-*d* may be examples of the corresponding features described with reference to FIG. 3. UE 115-*c* may be an example of a UE 115 described with reference to FIGS. 1 through 3.

As described above, each search space 400 may be divided into CCEs, each of which may span a plurality of REGs. As illustrated, each search space 400 contains 24 CCEs (e.g., 24 in a respective time period 410, 415). In some cases, time period 410 may represent a first OFDM symbol period and time period 415 may represent a second OFDM symbol period. That is, in some systems (e.g., mmW systems), processing gain may be better for TDM schemes where a UE 115 may use a first receive beam in one direction in a first symbol and a second receive beam (e.g., in another direction or the same direction) in a second symbol. In some cases, there might be a loss in the processing gain if the UE 115 splits its respective receive beams as may be the case in FDM. It is to be understood that the illustrations are for example purposes only, and that each search space 400 may contain any suitable number of CCEs (e.g., such that search space 400-*a* and search space 400-*b* may or may not be the same size). One, two, four, or eight CCEs may be aggregated to form a search candidate 405 (e.g., for PDCCH). Examples of such aggregations are provided with reference to search candidates 405-*g*, 405-*i*, 405-*h*, and 405-*j*, respectively (e.g., search candidate 405-*j* represents an aggregation level of 8, search candidate 405-*h* represents an aggregation level of 4, etc.). Each search space 400 may also be divided into a common search space and one or more UE-specific search spaces without deviating from the scope of the present disclosure. Accordingly, some of search candidates 405 (or portions thereof) may be common to one or more UEs 115. Each search space 400 and their corresponding search candidates 405 may define a respective core set, as described above, for each beam pair link 305. In some cases, the size of each core set may depend on a supported aggregation level for each beam pair link 305. For example, larger supported aggregation levels may result in longer time periods (e.g., two or three OFDM symbols) or a higher number of CCEs for each core set.

As described above, in some cases, each CCE may contain e.g., nine REGs. In some systems (e.g., LTE), these REGs may be logically continuous, but may be mapped in a distributed manner within the search space 400. As an example, the 9 REGs may not span tones 0 through 35; rather, a given CCE might be on tones 0, 1, 2, 3, 32, 33, 34, 35, 60, 61, 62, 63, etc. That is, the tones may not be contiguous.

Aspects of the present disclosure may be better understood with reference to a scheme employed in a wireless communications system (e.g., LTE system). In some such systems, UE 115-c may be operable to communicate using two carriers. Each carrier may be associated with a search space, which may resemble aspects of search space 400-a. That is, for the case of the present example, each multi-carrier search space may contain six search candidates 405. In some cases, the UE 115 communicating in such a system may perform uniform candidate restriction such that it performs a blind decode on only three search candidates 405 per multi-carrier search space (e.g., six total blind decodes). These numbers are used for the sake of simplicity and are intended as examples only.

In some systems (e.g., NR systems), in which UE 115-c is configured to monitor PDCCH on multiple beam pair links, increased flexibility may be desired. As an example, UE 115-c may be configured to perform non-uniform candidate restriction across search spaces 400-a and 400-b, which are associated with beam pair links 305-c and 305-d, respectively. That is, UE 115-c may independently perform candidate restriction for each search space 400 in order to reduce the number of search candidates 405, and hence the number of blind decodes. For example, UE 115-c may perform candidate restriction on search space 400-a such that it only performs blind decodes on search candidates 405-a and 405-d (e.g., does not attempt to decode search candidates 405-b, 405-c, 405-e, and 405-f). In some cases, this decision may be based on a look-up table or a configuration sent by a serving base station 105, as described below. In the present example, beam pair link 305-c may be associated with a relatively low SNR such that UE 115-c prioritizes search candidates with a higher aggregation level (e.g., four in the case of search candidates 405-a and 405-d).

In some cases, beam pair link 305-d and its associated search space 400-b may be treated separately. For example, UE 115-c may not perform candidate restriction on search space 400-b (e.g., may search all four available search candidates 405). Alternatively, in the case that beam pair link 305-d is associated with a relatively high SNR, UE 115-c may perform candidate restriction such that a blind decode is performed only on search candidate 405-g and/or on search candidate 405-i (e.g., search candidates 405 with a lower aggregation level compared with the other search candidates 405). As with candidate restriction for beam pair link 305-c, this decision may be made independently at UE 115-c (e.g., based on an SNR of the beam pair link 305-d and an associated look-up table). Additionally or alternatively, the decision may be based on some configuration sent from the serving base station 105.

As will be appreciated by comparing search spaces 400-a and 400-b, lower aggregation levels may increase the number of search candidates 405 that may be formed from a given number of CCEs (e.g., which may increase scheduling flexibility or otherwise benefit communications within the system). Accordingly, a base station 105 may be operable to dynamically or semi-statically configure the aggregation levels supported in a given search space 400 based on system communication parameters (e.g., an amount of traffic, signal quality, etc.). Accordingly, as described in the previous example, the search space 400 for one beam pair link (e.g., beam pair link 305-c) having a low SNR may contain only aggregation levels four and eight. The search space 400 for another beam pair link (e.g., beam pair link 305-d) having a relatively high SNR may contain only aggregation levels one and two. In some cases, both beam pair links may have a relatively high or low SNR such that each associated search space supports only aggregation levels one and two or four and eight, respectively. Other combinations of aggregation levels are also possible, and the supported aggregation level may depend on various factors in addition to or instead of SNR.

As discussed in these examples, in some cases, each beam pair link 305 may have a different table, which may influence how UE 115-c monitors the given search space. Various factors may influence the contents and implementation of the table (e.g., factors including but not limited to SNR, polarization, supported rank of UE 115-c, etc.). For example, UE 115-c may be able to receive signals in one polarization for beam pair link 305-c and signals in two polarizations for beam pair link 305-d. Accordingly, a table for beam pair link 305-d may prioritize search candidates 405 based on various factors which include polarization of the received signal. Such a consideration may not be applicable to the table for beam pair link 305-c. In some cases, UE 115-c may identify the intended table for a given beam pair link 305 from a list of tables. UE 115-c may explicitly convey its selection to a serving base station 105. Alternatively, the selection may be implicitly conveyed to the base station 105 (e.g., in the form of reported signal measurements). Additionally or alternatively, the base station 105 may configure the tables based on UE 115 measurement reports (e.g., via RRC signaling, a MAC control-element (MAC-CE), a layer 1 (L1) message, or any combinations thereof). That is, the list of tables and/or the table to be used for a given beam pair link 305 may be configured at the base station 105 and communicated to the UE 115.

In some cases, candidate restriction may be performed to ensure that the base station 105 has the flexibility to schedule multiple UEs 115. As described above with reference to FIG. 3, candidate restriction in some systems (e.g., LTE systems) may be applied across two carriers. In these systems, the CCE mapping within the given search space may be randomized as a function of the RNTI value (e.g., in addition to a slot index or SFN). Accordingly, there may be restrictions upon which CCEs are able to carry PDCCH, which limits scheduling flexibility for the base station 105. Techniques described herein may enable improved randomization of CCE mapping, which may in turn increase the flexibility of the scheduling. For example, CCE mapping randomization may be a function of one or more of the beam pair links 305, the OFDM symbol index, and the starting and/or ending RB index of the control resource set. For example, when a UE 115 is configured to monitor across multiple control resource sets, the CCE mapping randomization may be a function of the control resource set (e.g., which may help increase network flexibility). Other similar features may additionally or alternatively influence the CCE mapping randomization. By way of example, search spaces 400-a and 400-b may represent separate CCE mappings. In some conventional systems, the CCE mapping for a given slot index and RNTI may be fixed, such that the base station 105 may be restricted to transmitting the PDCCH in one of the search candidates 405 of a given search space 400. However, using the techniques described herein, increased degrees of freedom may be introduced to the CCE mapping by incorporating one or more of the factors described above. The increased degrees of freedom may correspond to increased flexibility, which may beneficially impact system throughput.

Figure 5:
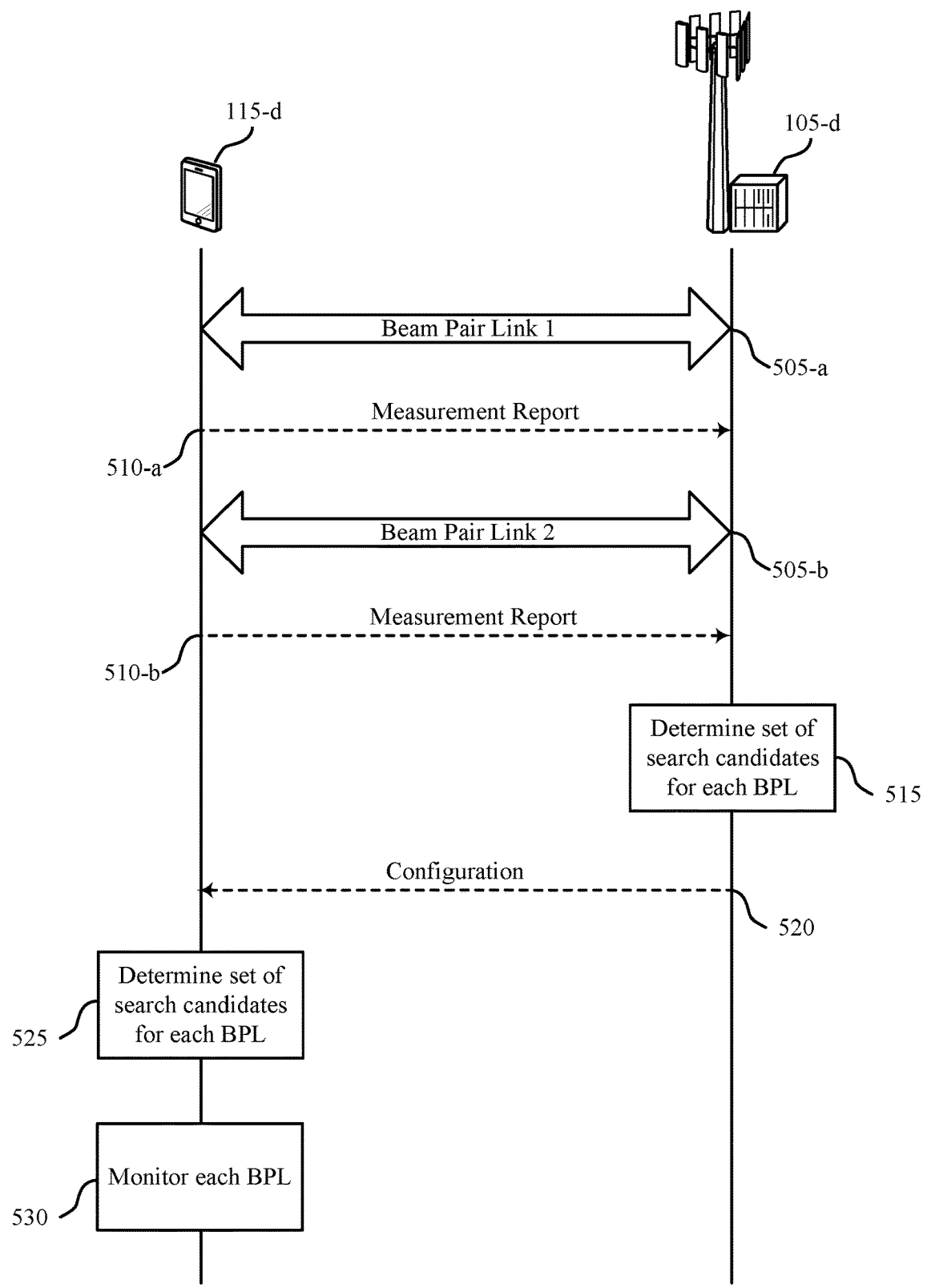
FIG. 5 illustrates an example of a process flow that supports non-uniform search candidate restriction in multi-link control channels in accordance with aspects of the present disclosure.

FIG. 5 illustrates a process flow 500 that supports non-uniform search candidate restriction in multi-link control channels in accordance with various aspects of the present disclosure. Process flow 500 includes a UE 115-d and a base station 105-*d*, each of which may be an example of the corresponding devices described above with reference to FIGS. 1 through 4.

At 505-*a* and 505-*b*, UE 115-*d* and base station 105-*d* may establish multiple beam pair links. The present example is described with multiple beam pair links 505 between a single base station 105-*d* and UE 115-*d*. As discussed with reference to FIG. 3, these techniques are also applicable in the case that the each of the multiple beam pair links 505 is between a respective base station 105 and UE 115-*d*. That is, in some cases the second beam pair link 505-*b* of UE 115-*d* corresponds to a beam pair link between the UE 115-*d* and a second base station 105 different from base station 105-*d*. The beam pair links may be established during cell acquisition or through a beam refinement procedure, for example.

At 510-*a* and 510-*b*, UE 115-*d* may optionally transmit a measurement report for beam pair links 505-*a* and 505-*b*, respectively. Each measurement report may contain information related to a capability of UE 115-*d* and/or communication quality over the given beam pair link 505. For instance, UE 115-*d* may transmit a measurement report for one or more of beam pair links established at 505-*a* and 505-*b*. The measurement report may contain channel state information (CSI) which may include information related to channel quality information (CQI), pre-coding matrix indicator, rank indicator, etc.

At 515, base station 105-*d* may determine a set of search candidates (e.g., PDCCH candidates) for each of the one or more beam pair links established at 505-*a* and 505-*b*. In some cases, the determined set of search candidates for each of the one or more beam pair links established at 505-*a* and 505-*b* may correspond to respective core sets of resources based on a supported aggregation level for each of the one or more beam pair links. Additionally, the determination may be based on a communication parameter associated with UE 115-*d* and with each of the beam pair links established at 505-*a* and 505-*b* or may be based on the option measurement report transmitted at 510-*a* or 510-*b*. In some examples, determining the set of search candidates may be based on a set of search candidate tables. In some aspects, base station 105-*d* may select a search candidate table for beam pair link 505-*a* and/or 505-*b* from the set of candidate tables. The number of search candidates of the search candidate table for the first beam pair link 505-*a* may be different from the number of search candidates for the second beam pair link 505-*b*. In some cases, base station 105-*d* may receive one or more measurement reports 510 from UE 115-*d* and determine the set of search candidates based on the measurement report. In some cases, base station 105-*d* may receive, from UE 115-*d*, a search candidate table message that indicates an intended search candidate table for one or more of the beam pair links established at 505-*a* and 505-*b*. Base station 105-*d* may determine the set of search candidates based on the intended search candidate table. In some cases, the set of search candidates is based on an aggregation level, a polarization, a rank, an SNR, or any combination thereof associated with a given beam pair link established at 505-*a* or 505-*b*. In some cases, the SNR for the given beam pair link established at 505-*a* or 505-*b* may be measured on PDCCH demodulation reference signal (DMRS) tones for the respective beam pair link. Alternatively, the SNR may be based on a reference signal (e.g., synchronization signal or CSI reference signal), which may be quasi-co-located with a PDCCH DMRS for the respective beam pair link.

At 520, base station 105-*d* may optionally transmit a message indicating one or more sets of search candidates for UE 115-*d* to use in monitoring the beam pair links established at 505-*a* and 505-*b*. In some cases, base station 105-*d* may transmit control information for UE 115-*d* over at least one of the beam pair links established at 505-*a* or 505-*b* in accordance with the determined set of search candidates. In some cases, base station 105-*d* may map a set of CCEs for each of the beam pair links established at 505-*a* and 505-*b* and the mapping of at least one of the sets of CCEs may be randomized based on a symbol index, a slot index, a subframe index, a resource block of a control resource set, or a carrier index.

At 525, after having identified the multiple beam pair links 505 for communication with one or more base stations 105, UE 115-*d* may determine a set of search candidates for each of the multiple beam pair links established at 505-*a* and 505-*b*. In some cases, each of the multiple beam pair links established at 505-*a* and 505-*b* may correspond to a respective set of search candidates, such that at least two of the multiple beam pair links established at 505-*a* and 505-*b* correspond to different numbers of search candidates. In some cases, UE 115-*d* may determine the set of search candidates for each of the multiple beam pair links established at 505-*a* and 505-*b* based on a set of search candidate tables. In some cases, UE 115-*d* may select a search candidate table for each of the multiple beam pair links established at 505-*a* and 505-*b* from the set of candidate tables. In some cases, UE 115-*d* may receive a message (e.g., message 520) from base station 105-*d* indicating a search candidate table having a set of search candidates corresponding to one or more of the beam pair links established at 505-*a* and 505-*b*. In some cases, this message may be received via an RRC channel, a MAC-CE, an L1 message, or any combinations thereof. In some cases, the set of search candidates for each of the multiple beam pair links established at 505-*a* and 505-*b* is determined based on an aggregation level, a polarization, a rank, a signal-to-noise ratio, or any combination thereof associated with each of the multiple beam pair links.

At 530, UE 115-*d* may monitor each of the multiple beam pair links established at 505-*a* and 505-*b* in accordance with the respective sets of search candidates. In some cases, UE 115-*d* may receive, over one or more of the beam pair links established at 505-*a* and 505-*b*, control information from base station 105-*d*. UE 115-*d* may receive this information based on monitoring the determined set of search candidates for the respective beam pair link established at 505-*a* or 505-*b*.

Figure 6:
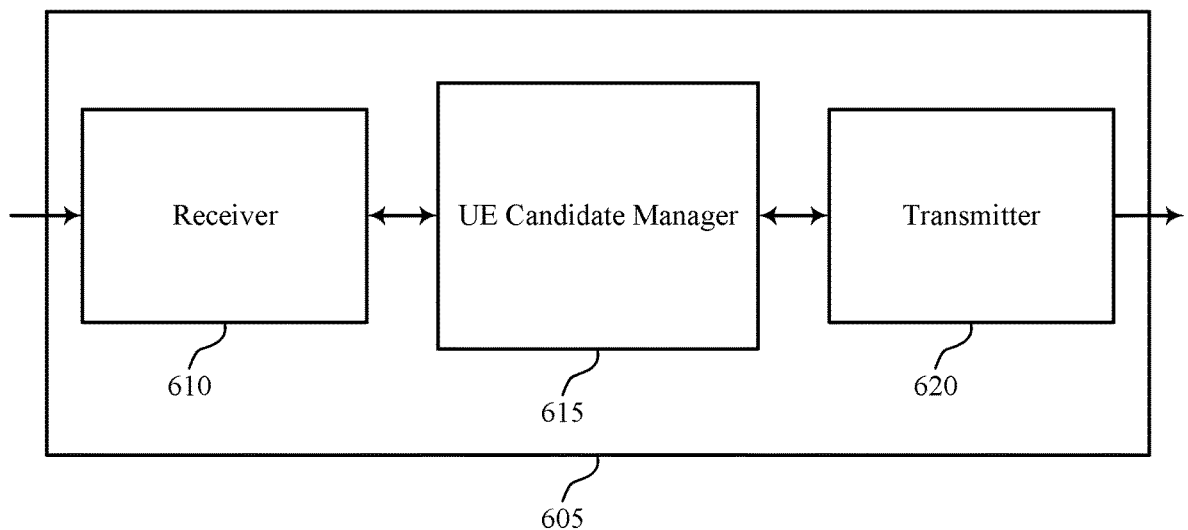
FIGS. 6 through 8 show block diagrams of a device that supports non-uniform search candidate restriction in multi-link control channels in accordance with aspects of the present disclosure.

FIG. 6 shows a block diagram 600 of a wireless device 605 that supports non-uniform search candidate restriction in multi-link control channels in accordance with various aspects of the present disclosure. Wireless device 605 may be an example of aspects of a UE 115 as described with reference to FIGS. 1 through 5. Wireless device 605 may include receiver 610, UE candidate manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to search candidates in multi-link control channel, etc.). Information may be passed on to other components of the device. The receiver 610 may be an example of aspects of the transceiver 935 described with reference to FIG. 9.

UE candidate manager 615 may be an example of aspects of the UE candidate manager 915 described with reference to FIG. 9. UE candidate manager 615 and/or at least some of its various sub-components may be implemented in hardware, software executed by a processor, firmware, or any combination thereof. If implemented in software executed by a processor, the functions of the UE candidate manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE candidate manager 615 and/or at least some of its various sub-components may be physically located at various positions, including being distributed such that portions of functions are implemented at different physical locations by one or more physical devices. In some examples, UE candidate manager 615 and/or at least some of its various sub-components may be a separate and distinct component in accordance with various aspects of the present disclosure. In other examples, UE candidate manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE candidate manager 615 may identify multiple beam pair links for communication with one or more base stations, determine a set of search candidates for each of the multiple beam pair links, each of the multiple beam pair links corresponding to a respective set of search candidates such that at least two of the multiple beam pair links correspond to different numbers of search candidates, and monitor each of the multiple beam pair links in accordance with the respective sets of search candidates.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
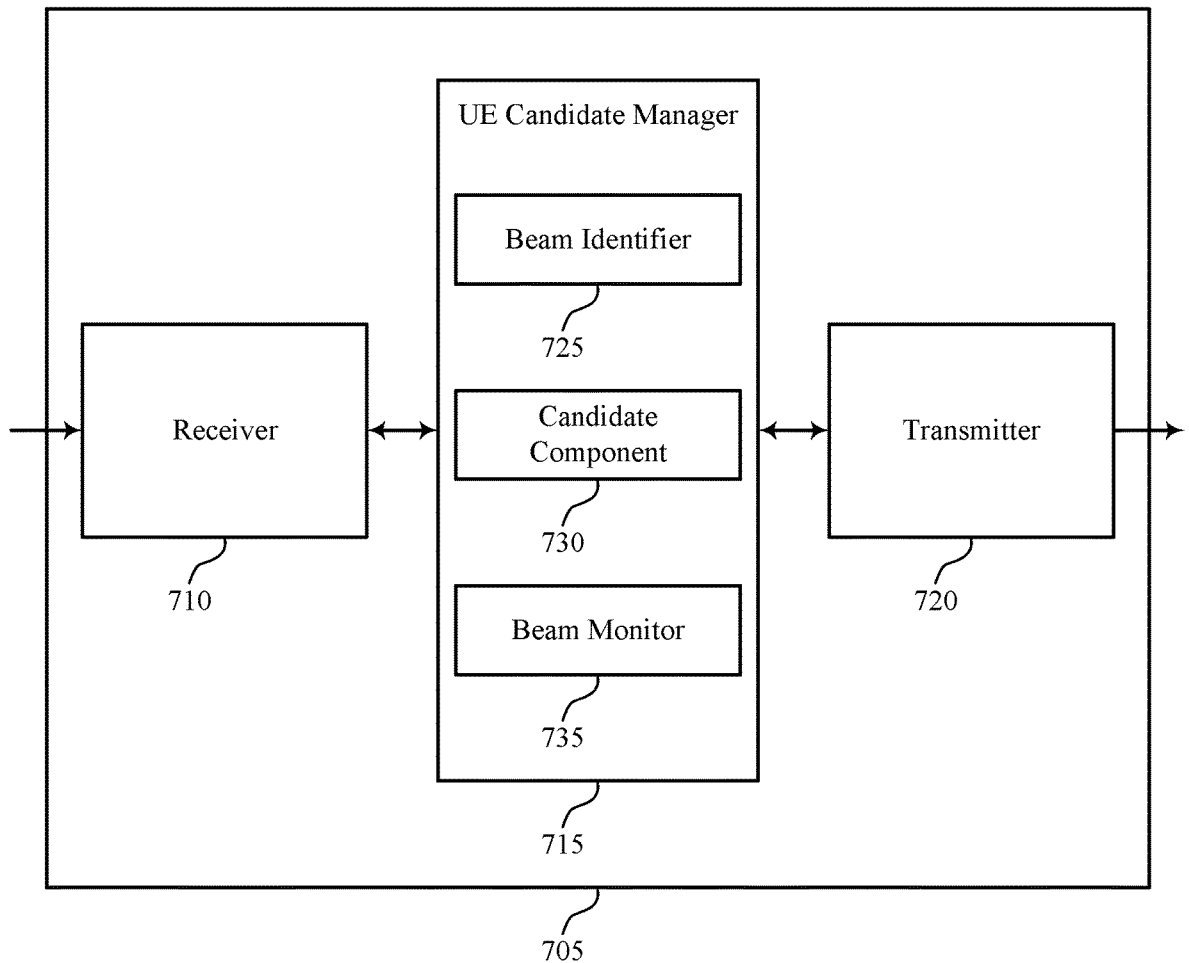

FIG. 7 shows a block diagram 700 of a wireless device 705 that supports non-uniform search candidate restriction in multi-link control channels in accordance with various aspects of the present disclosure. Wireless device 705 may be an example of aspects of a wireless device 605 or a UE 115 as described with reference to FIGS. 1 through 6. Wireless device 705 may include receiver 710, UE candidate manager 715, and transmitter 720. wireless device 705 may also include a processor. Each of these components may be in communication with one another (e.g., via one or more buses).

Receiver 710 may receive information such as packets, user data, or control information associated with various information channels (e.g., control channels, data channels, and information related to search candidates in multi-link control channel, etc.). Information may be passed on to other components of the device. The receiver 710 may be an example of aspects of the transceiver 935 described with reference to FIG. 9.

UE candidate manager 715 may be an example of aspects of the UE candidate manager 915 described with reference to FIG. 9. UE candidate manager 715 may also include beam identifier 725, candidate component 730, and beam monitor 735.

Beam identifier 725 may identify multiple beam pair links for communication with one or more base stations.

Candidate component 730 may determine a set of search candidates for each of the multiple beam pair links, each of the multiple beam pair links corresponding to a respective set of search candidates such that at least two of the multiple beam pair links correspond to different numbers of search candidates. In some cases, the determined set of search candidates for each of the multiple beam pair links may correspond to respective core sets of resources based on a supported aggregation level for each of the multiple beam pair links. In some cases, determining the set of search candidates for each of the multiple beam pair links includes determining the set of search candidates for each of the multiple beam pair links based on a set of search candidate tables. In some cases, the set of search candidates for each of the multiple beam pair links is determined based on an aggregation level, a polarization, a rank, a signal to noise ratio, or any combination thereof associated with each of the multiple beam pair links.

Beam monitor 735 may monitor each of the multiple beam pair links in accordance with the respective sets of search candidates.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
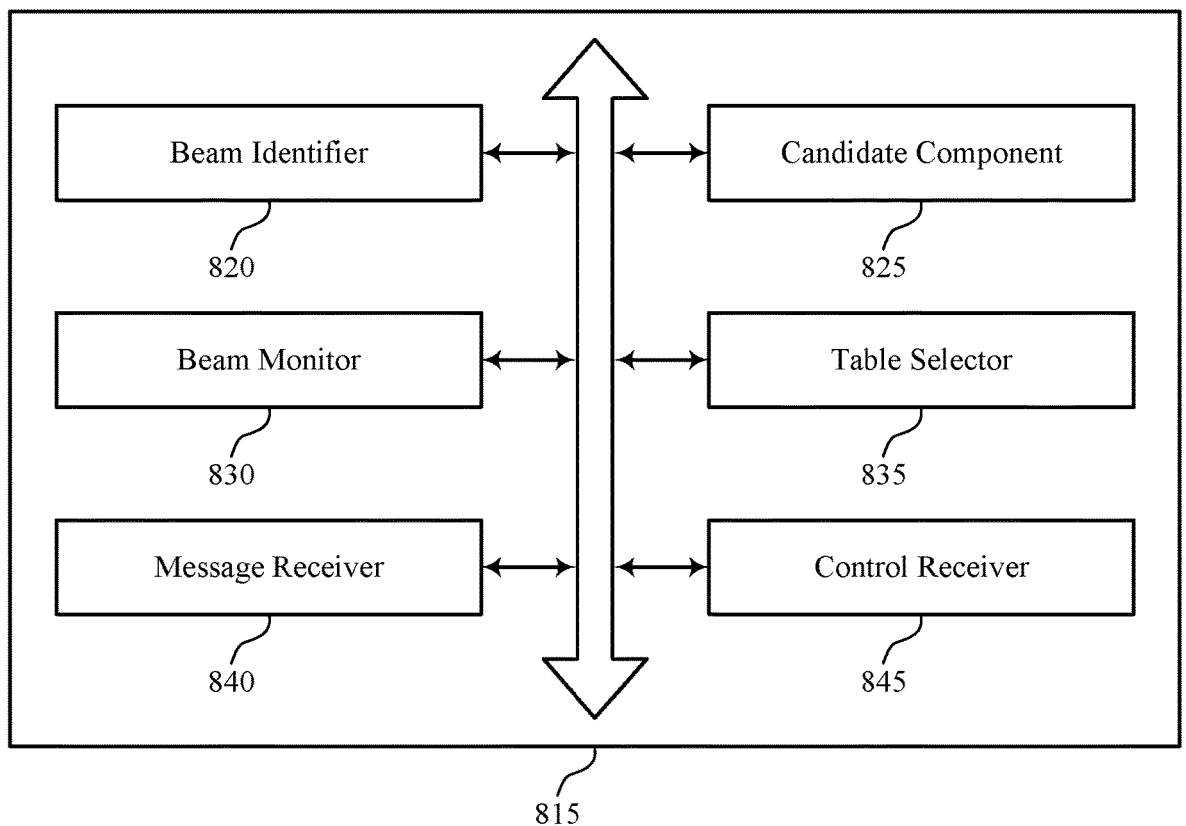

FIG. 8 shows a block diagram 800 of a UE candidate manager 815 that supports non-uniform search candidate restriction in multi-link control channels in accordance with various aspects of the present disclosure. The UE candidate manager 815 may be an example of aspects of a UE candidate manager 615, a UE candidate manager 715, or a UE candidate manager 915 described with reference to FIGS. 6, 7, and 9. The UE candidate manager 815 may include beam identifier 820, candidate component 825, beam monitor 830, table selector 835, message receiver 840, and control receiver 845. Each of these modules may communicate, directly or indirectly, with one another (e.g., via one or more buses).

Beam identifier 820 may identify multiple beam pair links for communication with one or more base stations.

Candidate component 825 may determine a set of search candidates for each of the multiple beam pair links, each of the multiple beam pair links corresponding to a respective set of search candidates such that at least two of the multiple beam pair links correspond to different numbers of search candidates. In some cases, the determined set of search candidates for each of the multiple beam pair links may correspond to respective core sets of resources based on a supported aggregation level for each of the multiple beam pair links. In some cases, determining the set of search candidates for each of the multiple beam pair links includes determining the set of search candidates for each of the multiple beam pair links based on a set of search candidate tables. In some cases, the set of search candidates for each of the multiple beam pair links is determined based on an aggregation level, a polarization, a rank, a signal to noise ratio, or any combination thereof associated with each of the multiple beam pair links.

Beam monitor 830 may monitor each of the multiple beam pair links in accordance with the respective sets of search candidates.

Table selector 835 may select a search candidate table for each of the multiple beam pair links from the set of candidate tables.

Message receiver 840 may receive a message from a base station of the one or more base stations, the message indicating a search candidate table having a set of search candidates corresponding to a beam pair link for communication with the base station. In some cases, the message is received via an RRC channel, a MAC-CE, an L1 message, or any combinations thereof.

Control receiver 845 may receive, over a beam pair link of the multiple beam pair links, control information from a base station of the one or more base stations, the receiving based on the determined set of search candidates for the beam pair link.

Figure 9:
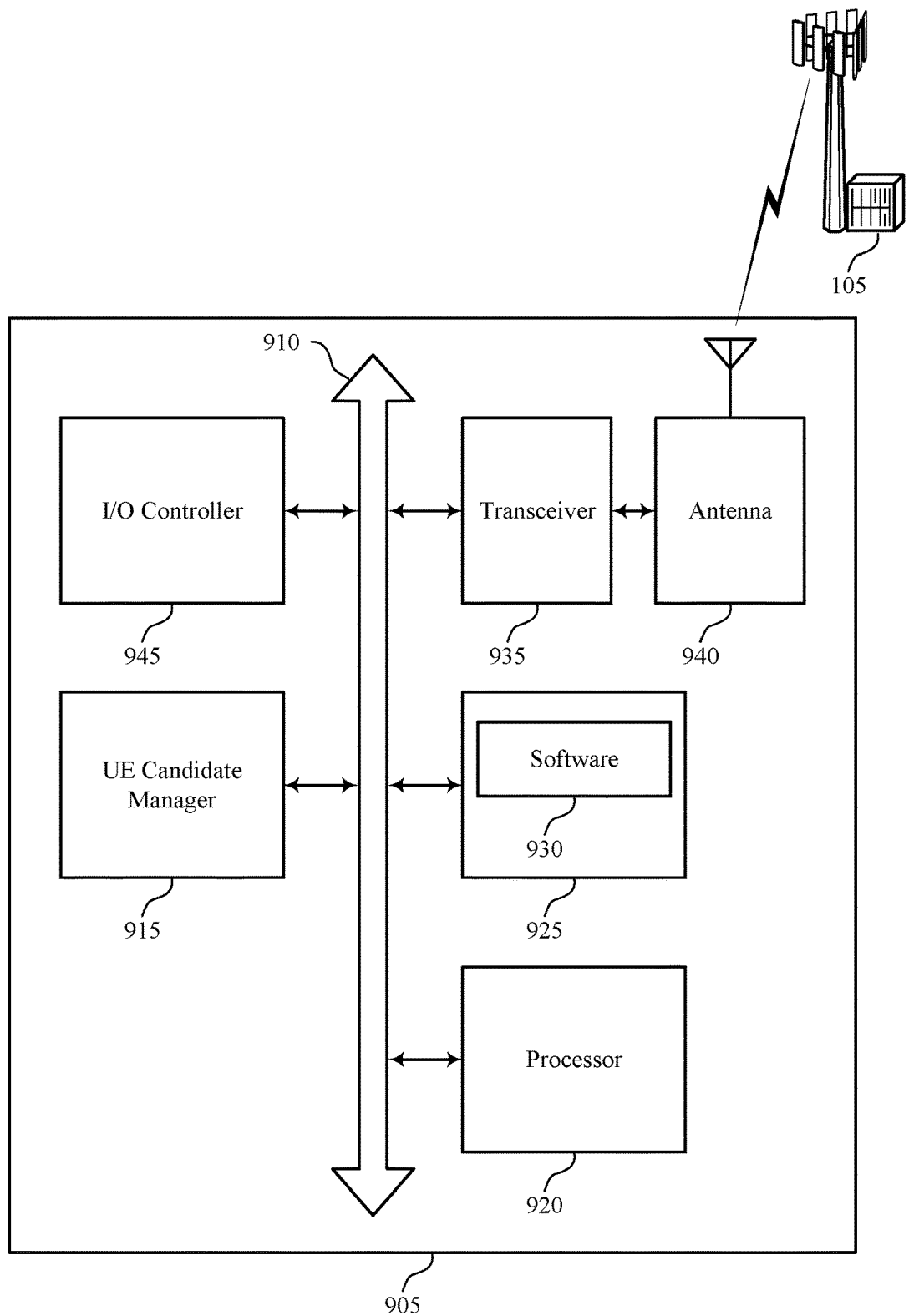
FIG. 9 illustrates a block diagram of a system including a UE that supports non-uniform search candidate restriction in multi-link control channels in accordance with aspects of the present disclosure.

FIG. 9 shows a diagram of a system 900 including a device 905 that supports non-uniform search candidate restriction in multi-link control channels in accordance with various aspects of the present disclosure. Device 905 may be an example of or include the components of wireless device 605, wireless device 705, or a UE 115 as described above, e.g., with reference to FIGS. 1 through 8. Device 905 may include components for bi-directional voice and data communications including components for transmitting and receiving communications, including UE candidate manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting search candidates in multi-link control channel).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support search candidates in multi-link control channel. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
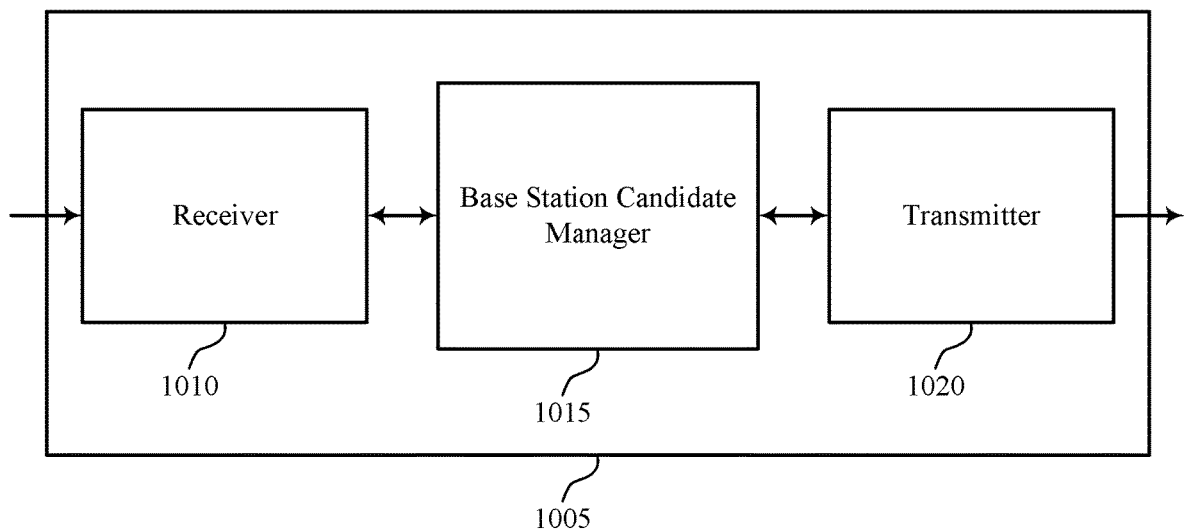
FIGS. 10 through 12 show block diagrams of a device that supports non-uniform search candidate restriction in multi-link control channels in accordance with aspects of the present disclosure.

FIG. 10 shows a block diagram 1000 of a wireless device 1005 that supports non-uniform search candidate restriction in multi-link control channels in accordance with various aspects of the present disclosure. Wireless device 1005 may be an example of aspects of a base station 105 as described with reference to FIGS. 1 through 5. Wireless device 1005 may include receiver 1010, base station candidate manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to search candidates in multi-link control channel, etc.). Information may be passed on to other components of the device. The receiver 1010 may be an example of aspects of the transceiver 1335 described with reference to FIG. 13.

Base station candidate manager 1015 may be an example of aspects of the base station candidate manager 1315 described with reference to FIG. 13. Base station candidate manager 1015 and/or at least some of its various sub-components may be implemented in hardware, software executed by a processor, firmware, or any combination thereof. If implemented in software executed by a processor, the functions of the base station candidate manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station candidate manager 1015 and/or at least some of its various sub-components may be physically located at various positions, including being distributed such that portions of functions are implemented at different physical locations by one or more physical devices. In some examples, base station candidate manager 1015 and/or at least some of its various sub-components may be a separate and distinct component in accordance with various aspects of the present disclosure. In other examples, base station candidate manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station candidate manager 1015 may identify, at a base station, one or more beam pair links for communication with a UE, determine a set of search candidates for each of the one or more beam pair links based on a communication parameter associated with the UE and with each of the one or more beam pair links, and transmit, to the UE, a message indicating the sets of search candidates for use in monitoring by the UE the one or more beam pair links.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
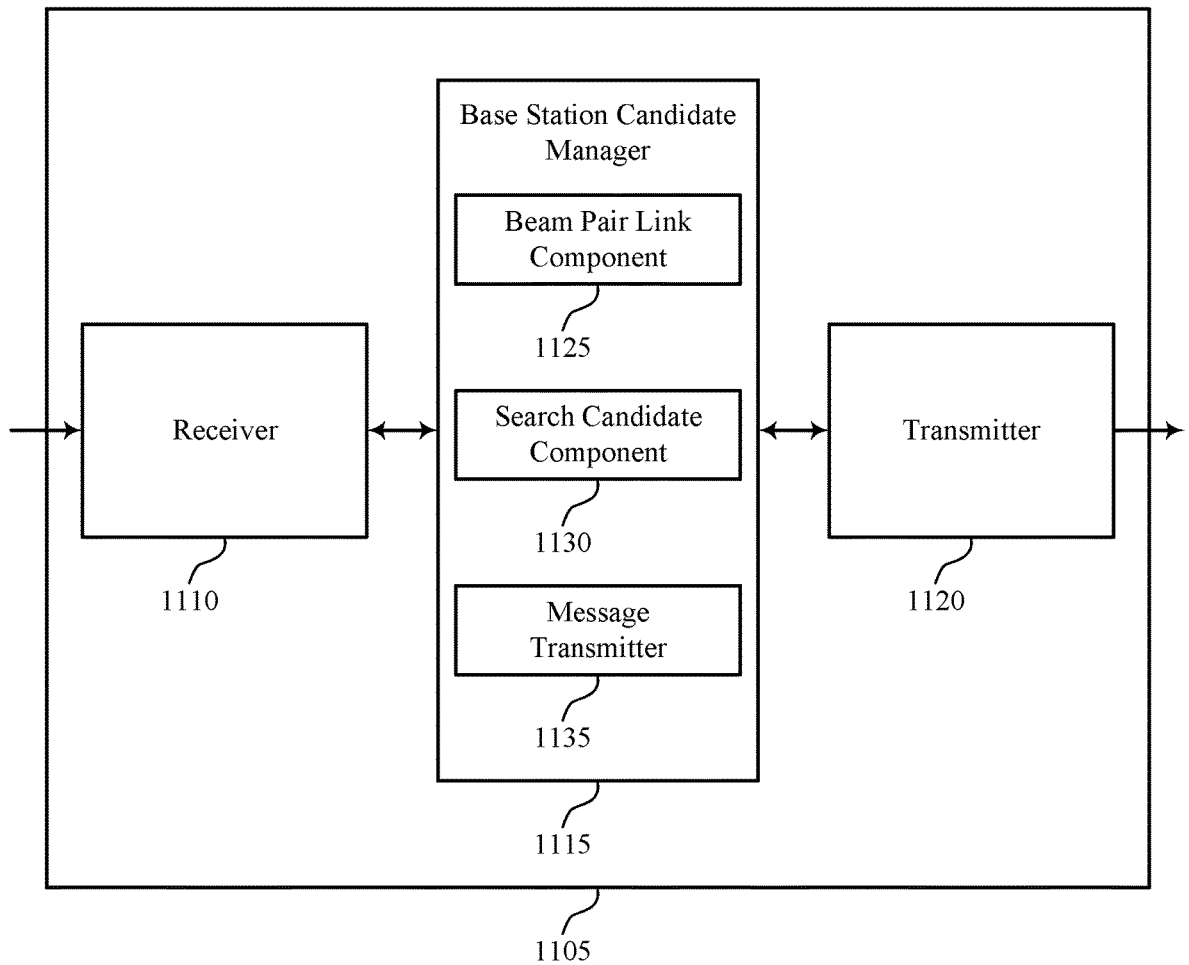

FIG. 11 shows a block diagram 1100 of a wireless device 1105 that supports non-uniform search candidate restriction in multi-link control channels in accordance with various aspects of the present disclosure. Wireless device 1105 may be an example of aspects of a wireless device 1005 or a base station 105 as described with reference to FIGS. 1 through 5 and 10. Wireless device 1105 may include receiver 1110, base station candidate manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to search candidates in multi-link control channel, etc.). Information may be passed on to other components of the device. The receiver 1110 may be an example of aspects of the transceiver 1335 described with reference to FIG. 13.

Base station candidate manager 1115 may be an example of aspects of the base station candidate manager 1315 described with reference to FIG. 13. Base station candidate manager 1115 may also include beam pair link component 1125, search candidate component 1130, and message transmitter 1135.

Beam pair link component 1125 may identify, at a base station, one or more beam pair links for communication with a UE.

Search candidate component 1130 may determine a set of search candidates for each of the one or more beam pair links based on a communication parameter associated with the UE and with each of the one or more beam pair links, and select a search candidate table for the beam pair link from the set of candidate tables, where a number of search candidates of the search candidate table for a first beam pair link of the UE is different from a number of search candidates for a second beam pair link of the UE. Search candidate component 1130 may determine the set of search candidates based on the measurement report, and determine the set of search candidates based on the intended search candidate table. In some cases, the determined set of search candidates for each of the multiple beam pair links may correspond to respective core sets of resources based on a supported aggregation level for each of the multiple beam pair links. In some cases, determining the sets of search candidates for each of the one or more beam pair links includes determining the set of search candidates for the one or more beam pair links based on a set of search candidate tables. In some cases, the second beam pair link of the UE corresponds to a beam pair link between the UE and the base station or between the UE and a second different base station. In some cases, the set of search candidates is based on an aggregation level, a polarization, a rank, a signal to noise ratio, or any combination thereof associated with the beam pair link.

Message transmitter 1135 may transmit, to the UE, a message indicating the sets of search candidates for use in monitoring by the UE the one or more beam pair links.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
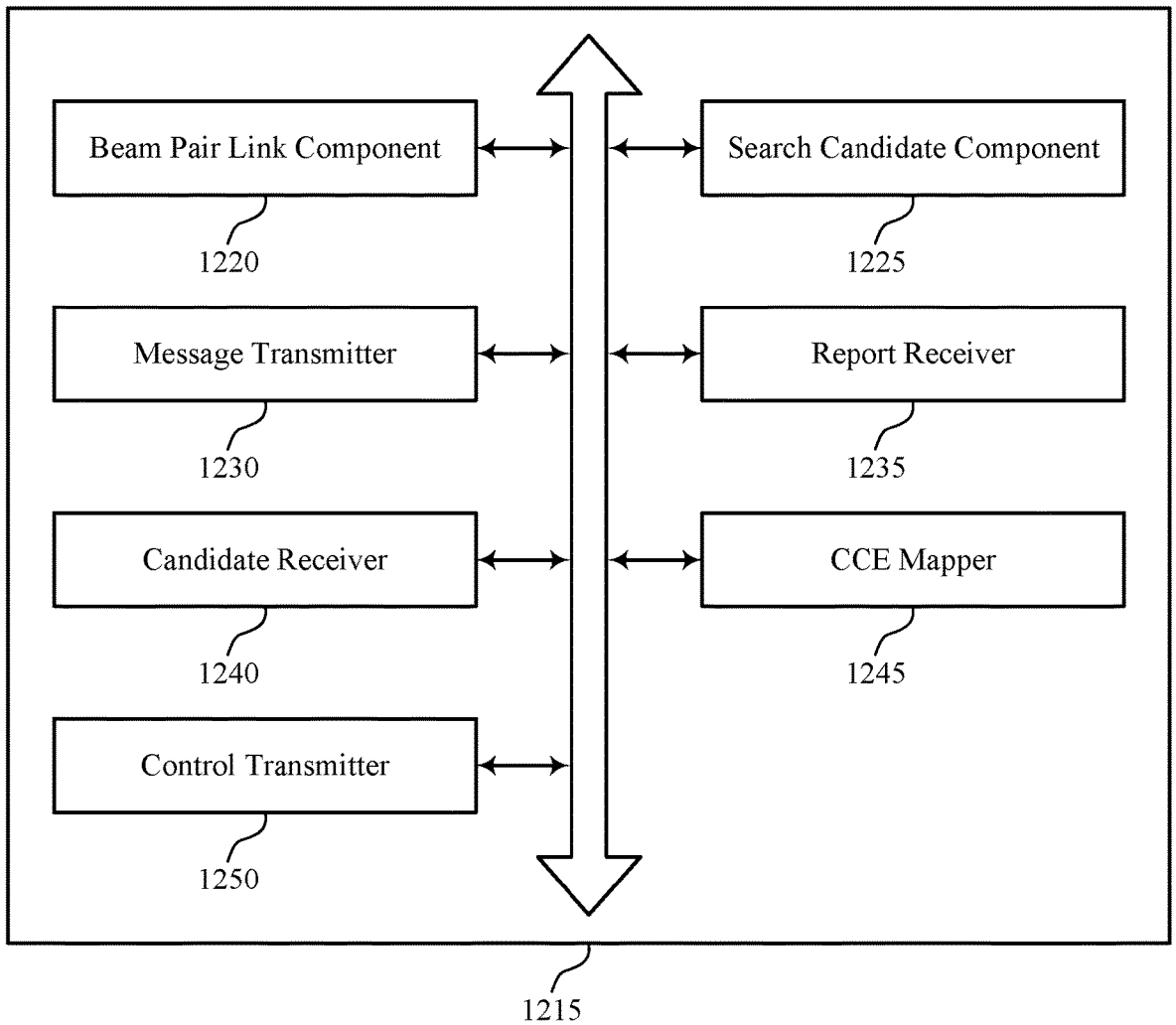

FIG. 12 shows a block diagram 1200 of a base station candidate manager 1215 that supports non-uniform search candidate restriction in multi-link control channels in accordance with various aspects of the present disclosure. The base station candidate manager 1215 may be an example of aspects of a base station candidate manager 1015, 1115, and 1315 described with reference to FIGS. 10, 11, and 13, respectively. The base station candidate manager 1215 may include beam pair link component 1220, search candidate component 1225, message transmitter 1230, report receiver 1235, candidate receiver 1240, CCE mapper 1245, and control transmitter 1250. Each of these modules may communicate, directly or indirectly, with one another (e.g., via one or more buses).

Beam pair link component 1220 may identify, at a base station, one or more beam pair links for communication with a UE.

Search candidate component 1225 may determine a set of search candidates for each of the one or more beam pair links based on a communication parameter associated with the UE and with each of the one or more beam pair links, and select a search candidate table for the beam pair link from the set of candidate tables, where a number of search candidates of the search candidate table for a first beam pair link of the UE is different from a number of search candidates for a second beam pair link of the UE. Search candidate component 1225 may determine the set of search candidates based on the measurement report, and determine the set of search candidates based on the intended search candidate table. In some cases, the determined set of search candidates for each of the multiple beam pair links may correspond to respective core sets of resources based on a supported aggregation level for each of the multiple beam pair links. In some cases, determining the sets of search candidates for each of the one or more beam pair links includes determining the set of search candidates for the one or more beam pair links based on a set of search candidate tables. In some cases, the second beam pair link of the UE corresponds to a beam pair link between the UE and the base station or between the UE and a second different base station. In some cases, the set of search candidates is based on an aggregation level, a polarization, a rank, a signal to noise ratio, or any combination thereof associated with the beam pair link.

Message transmitter 1230 may transmit, to the UE, a message indicating the sets of search candidates for use in monitoring by the UE the one or more beam pair links.

Report receiver 1235 may receive reports from the UE. In some cases, determining the set of search candidates includes receiving a measurement report from the UE.

Candidate receiver 1240 may receive candidates or tables from the UE. In some cases, determining the set of search candidates includes receiving, from the UE, a search candidate table message that indicates an intended search candidate table for the beam pair link.

CCE mapper 1245 may map a set of CCEs for each of the one or more beam pair links, where the mapping of at least one of the sets of CCEs is randomized based on a symbol index, a slot index, a subframe index, a resource block of a control resource set, or a carrier index.

Control transmitter 1250 may transmit control information for the UE over an established beam pair link in accordance with the determined set of search candidates.

Figure 13:
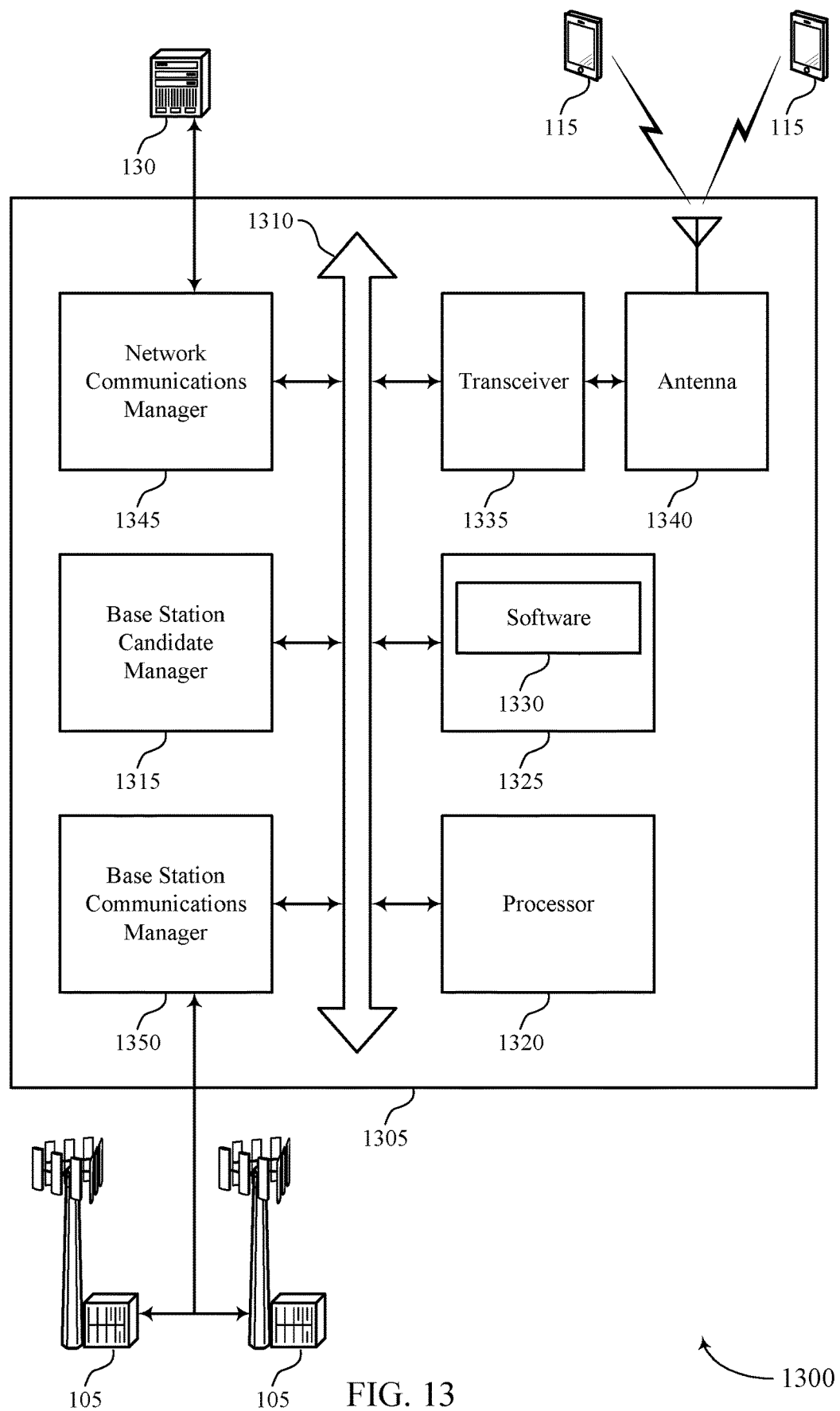
FIG. 13 illustrates a block diagram of a system including a base station that supports non-uniform search candidate restriction in multi-link control channels in accordance with aspects of the present disclosure.

FIG. 13 shows a diagram of a system 1300 including a device 1305 that supports non-uniform search candidate restriction in multi-link control channels in accordance with various aspects of the present disclosure. Device 1305 may be an example of or include the components of base station 105 as described above, e.g., with reference to FIGS. 1 through 5 and 10 through 12. Device 1305 may include components for bi-directional voice and data communications including components for transmitting and receiving communications, including base station candidate manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting search candidates in multi-link control channel).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support search candidates in multi-link control channel. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
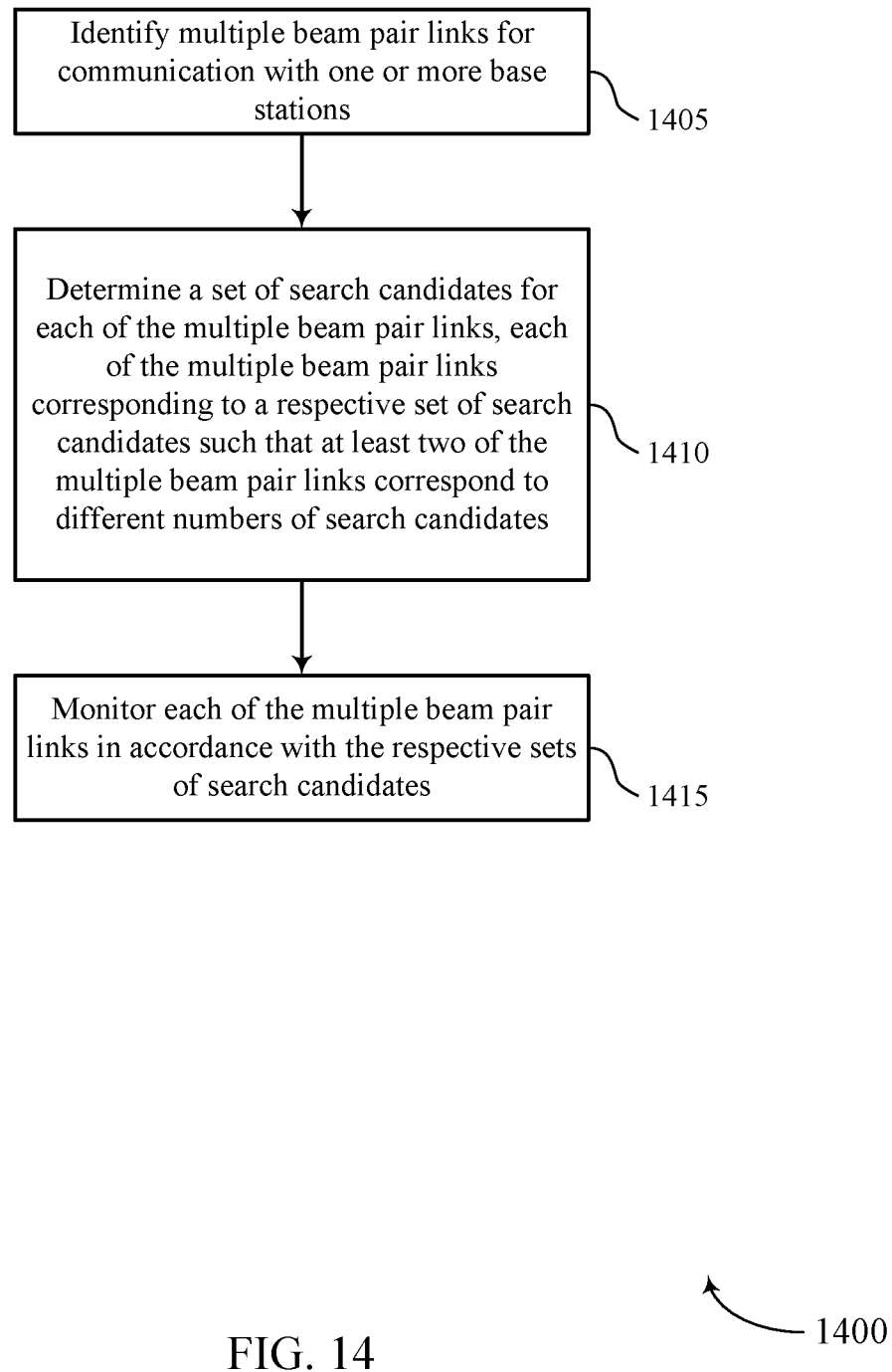
FIGS. 14 through 15 illustrate methods for non-uniform search candidate restriction in multi-link control channels in accordance with aspects of the present disclosure.

FIG. 14 shows a flowchart illustrating a method 1400 for non-uniform search candidate restriction in multi-link control channels in accordance with various aspects of the present disclosure. The operations of method 1400 may be implemented by a UE 115 or its components as described herein. For example, the operations of method 1400 may be performed by a UE candidate manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify multiple beam pair links for communication with one or more base stations. The operations of block 1405 may be performed according to the methods described with reference to FIGS. 1 through 5. In certain examples, aspects of the operations of block 1405 may be performed by a beam identifier as described with reference to FIGS. 6 through 9.

At block 1410 the UE 115 may determine a set of search candidates for each of the multiple beam pair links, each of the multiple beam pair links corresponding to a respective set of search candidates such that at least two of the multiple beam pair links correspond to different numbers of search candidates. The operations of block 1410 may be performed according to the methods described with reference to FIGS. 1 through 5. In certain examples, aspects of the operations of block 1410 may be performed by a candidate component as described with reference to FIGS. 6 through 9.

At block 1415 the UE 115 may monitor each of the multiple beam pair links in accordance with the respective sets of search candidates. The operations of block 1415 may be performed according to the methods described with reference to FIGS. 1 through 5. In certain examples, aspects of the operations of block 1415 may be performed by a beam monitor as described with reference to FIGS. 6 through 9.

Figure 15:
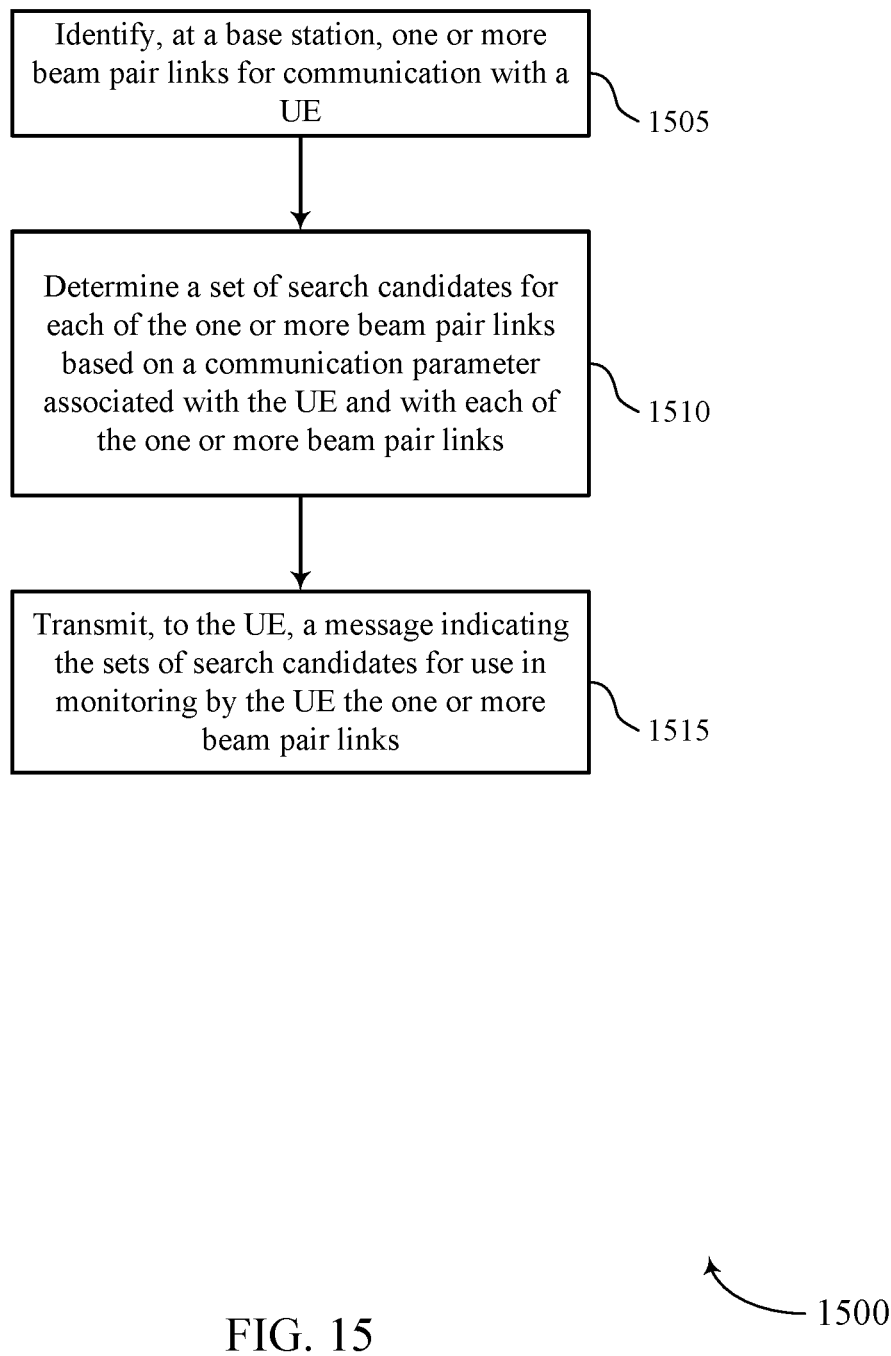

FIG. 15 shows a flowchart illustrating a method 1500 for non-uniform search candidate restriction in multi-link control channels in accordance with various aspects of the present disclosure. The operations of method 1500 may be implemented by a base station 105 or its components as described herein. For example, the operations of method 1500 may be performed by a base station candidate manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify, at a base station, one or more beam pair links for communication with a UE. The operations of block 1505 may be performed according to the methods described with reference to FIGS. 1 through 5. In certain examples, aspects of the operations of block 1505 may be performed by a beam pair link component as described with reference to FIGS. 10 through 13.

At block 1510 the base station 105 may determine a set of search candidates for each of the one or more beam pair links based on a communication parameter associated with the UE and with each of the one or more beam pair links. The operations of block 1510 may be performed according to the methods described with reference to FIGS. 1 through 5. In certain examples, aspects of the operations of block 1510 may be performed by a search candidate component as described with reference to FIGS. 10 through 13.

At block 1515 the base station 105 may transmit, to the UE, a message indicating the sets of search candidates for use in monitoring by the UE the one or more beam pair links. The operations of block 1515 may be performed according to the methods described with reference to FIGS. 1 through 5. In certain examples, aspects of the operations of block 1515 may be performed by a message transmitter as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). "3rd Generation Partnership Project" (3GPP) LTE/LTE-A are releases of UMTS that use E-UTRA. UTRA, E-UTRA, UMTS, LTE, LTE-A, NR, and Global System for Mobile communications (GSM) are described in documents from the organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A or NR networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying multiple beam pair links for communication with one or more base stations;
determining a set of search candidates for each of the multiple beam pair links based at least in part on a search candidate configuration indicating that each of the multiple beam pair links corresponds to a respective set of search candidates such that at least two of the multiple beam pair links correspond to different numbers of search candidates; and
monitoring each of the multiple beam pair links in accordance with the respective sets of search candidates.

2. The method of claim 1, wherein the determined set of search candidates for each of the multiple beam pair links corresponds to respective core sets of resources based at least in part on a supported aggregation level for each of the multiple beam pair links.

3. The method of claim 1, wherein determining the set of search candidates for each of the multiple beam pair links comprises:
determining the set of search candidates for each of the multiple beam pair links based at least in part on a set of search candidate tables.

4. The method of claim 3, further comprising:
selecting a search candidate table for each of the multiple beam pair links from the set of candidate tables.

5. The method of claim 1, further comprising:
receiving a message from a base station of the one or more base stations, the message indicating a search candidate table having a set of search candidates corresponding to a beam pair link for communication with the base station.

6. The method of claim 5, wherein the message is received via a radio resource control (RRC) channel, a medium access control control-element (MAC-CE), a layer 1 (L1) message, or any combinations thereof.

7. The method of claim 1, further comprising:
receiving, over a beam pair link of the multiple beam pair links, control information from a base station of the one or more base stations, the receiving based at least in part on the determined set of search candidates for the beam pair link.

8. The method of claim 1, wherein the set of search candidates for each of the multiple beam pair links is determined based at least in part on an aggregation level, a polarization, a rank, a signal to noise ratio, or any combination thereof associated with each of the multiple beam pair links.

9. A method for wireless communication, comprising:
identifying, at a base station, multiple beam pair links for communication with a user equipment (UE);
determining a set of search candidates for each of the multiple beam pair links based at least in part on a communication parameter associated with the UE and with each of the multiple beam pair links, wherein at least two beam pair links of the multiple beam pair links correspond to different numbers of search candidates; and
transmitting, to the UE, a search candidate configuration indicating the sets of search candidates and the at least two beam pair links of the multiple beam pair links with the different numbers of search candidates for use in monitoring by the UE the multiple beam pair links.

10. The method of claim 9, wherein the determined set of search candidates for each of the multiple beam pair links corresponds to respective core sets of resources based at least in part on a supported aggregation level for each of the multiple beam pair links.

11. The method of claim 9, wherein determining the sets of search candidates for each of the multiple beam pair links comprises:
determining the set of search candidates for the multiple beam pair links based at least in part on a set of search candidate tables.

12. The method of claim 11, further comprising:
selecting a search candidate table for the beam pair link from the set of candidate tables, wherein a number of search candidates of the search candidate table for a first beam pair link of the UE is different from a number of search candidates for a second beam pair link of the UE.

13. The method of claim 12, wherein the second beam pair link of the UE corresponds to a beam pair link between the UE and the base station or between the UE and a second different base station.

14. The method of claim 9, wherein determining the set of search candidates comprises:
receiving a measurement report from the UE; and
determining the set of search candidates based at least in part on the measurement report.

15. The method of claim 9, wherein determining the set of search candidates comprises:
receiving, from the UE, a search candidate table message that indicates an intended search candidate table for the beam pair link; and
determining the set of search candidates based at least in part on the intended search candidate table.

16. The method of claim 9, wherein the set of search candidates is based at least in part on an aggregation level, a polarization, a rank, a signal to noise ratio, or any combination thereof associated with the beam pair link.

17. The method of claim 9, further comprising:
mapping a set of control channel elements (CCEs) for each of the multiple beam pair links, wherein the mapping of at least one of the sets of CCEs is randomized based at least in part on a symbol index, a slot index, a subframe index, a resource block of a control resource set, or a carrier index.

18. The method of claim 9, further comprising:
transmitting control information for the UE over an established beam pair link in accordance with the determined set of search candidates.

19. An apparatus for wireless communication, in a system comprising:
a processor;
memory in electronic communication with the processor; and
instructions stored in the memory and operable, when executed by the processor, to cause the apparatus to:
identify multiple beam pair links for communication with one or more base stations;
determine a set of search candidates for each of the multiple beam pair links based at least in part on a search candidate configuration indicating that each of the multiple beam pair links corresponds to a respective set of search candidates such that at least two of the multiple beam pair links correspond to different numbers of search candidates; and
monitor each of the multiple beam pair links in accordance with the respective sets of search candidates.

20. The apparatus of claim 19, wherein the determined set of search candidates for each of the multiple beam pair links corresponds to respective core sets of resources based at least in part on a supported aggregation level for each of the multiple beam pair links.

21. The apparatus of claim 19, wherein the instructions are further executable by the processor to:
determine the set of search candidates for each of the multiple beam pair links based at least in part on a set of search candidate tables.

22. The apparatus of claim 21, wherein the instructions are further executable by the processor to:
select a search candidate table for each of the multiple beam pair links from the set of candidate tables.

23. The apparatus of claim 19, wherein the instructions are further executable by the processor to:
- receive a message from a base station of the one or more base stations, the message indicating a search candidate table having a set of search candidates corresponding to a beam pair link for communication with the base station.

24. The apparatus of claim 23, wherein the message is received via a radio resource control (RRC) channel, a medium access control control-element (MAC-CE), a layer 1 (L1) message, or any combinations thereof.

25. An apparatus for wireless communication, comprising:
- a processor;
- memory in electronic communication with the processor; and
- instructions stored in the memory and executable by the processor to cause the apparatus to:
  - identify, at a base station, multiple beam pair links for communication with a user equipment (UE);
  - determine a set of search candidates for each of the multiple beam pair links based at least in part on a communication parameter associated with the UE and with each of the multiple beam pair links, wherein at least two beam pair links of the multiple beam pair links correspond to different numbers of search candidates; and
  - transmit, to the UE, a search candidate configuration indicating the sets of search candidates and the at least two beam pair links of the multiple beam pair links with the different numbers of search candidates for use in monitoring by the UE the multiple beam pair links.

26. The apparatus of claim 25, wherein the determined set of search candidates for each of the multiple beam pair links corresponds to respective core sets of resources based at least in part on a supported aggregation level for each of the multiple beam pair links.

27. The apparatus of claim 25, wherein the instructions to determine the sets of search candidates for each of the multiple beam pair links are executable by the processor to cause the apparatus to:
- determine the set of search candidates for the multiple beam pair links based at least in part on a set of search candidate tables.

28. The apparatus of claim 27, wherein the instructions are further executable by the processor to cause the apparatus to:
- select a search candidate table for the beam pair link from the set of candidate tables, wherein a number of search candidates of the search candidate table for a first beam pair link of the UE is different from a number of search candidates for a second beam pair link of the UE.

29. The apparatus of claim 28, wherein the second beam pair link of the UE corresponds to a beam pair link between the UE and the base station or between the UE and a second different base station.

30. The apparatus of claim 25, wherein the instructions to determine the set of search candidates are executable by the processor to cause the apparatus to:
- receive a measurement report from the UE; and
- determine the set of search candidates based at least in part on the measurement report.

* * * * *